United States Patent
Smith

(10) Patent No.: US 8,380,036 B2
(45) Date of Patent: Feb. 19, 2013

(54) SPLITTER MODULE WITH CONNECTORIZED PIGTAIL MANAGER

(75) Inventor: Trevor D. Smith, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 380 days.

(21) Appl. No.: 12/690,780

(22) Filed: Jan. 20, 2010

(65) Prior Publication Data

US 2010/0183276 A1 Jul. 22, 2010

Related U.S. Application Data

(60) Provisional application No. 61/145,869, filed on Jan. 20, 2009.

(51) Int. Cl.
*G02B 6/36* (2006.01)

(52) U.S. Cl. .................................. 385/136; 385/135

(58) Field of Classification Search .................. None
See application file for complete search history.

(56) References Cited

U.S. PATENT DOCUMENTS

| | | | |
|---|---|---|---|
| 5,548,678 A * | 8/1996 | Frost et al. ............... | 385/135 |
| 5,969,294 A | 10/1999 | Eberle et al. | |
| 6,547,585 B2 * | 4/2003 | Bradley et al. ........... | 439/353 |
| 6,983,095 B2 | 1/2006 | Reagan et al. | |
| 7,088,899 B2 | 8/2006 | Reagan et al. | |
| 7,103,255 B2 | 9/2006 | Reagan et al. | |
| 7,146,089 B2 | 12/2006 | Reagan et al. | |
| 7,171,102 B2 | 1/2007 | Reagan et al. | |
| 7,198,409 B2 | 4/2007 | Smith et al. | |
| 7,200,317 B2 | 4/2007 | Reagan et al. | |
| 7,218,827 B2 | 5/2007 | Vongseng et al. | |
| 7,233,731 B2 | 6/2007 | Solheid et al. | |
| 7,277,620 B2 | 10/2007 | Vongseng et al. | |
| 7,369,741 B2 | 5/2008 | Reagan et al. | |
| 7,400,816 B2 | 7/2008 | Reagan et al. | |
| 7,406,242 B1 * | 7/2008 | Braga ..................... | 385/135 |
| 7,407,330 B2 | 8/2008 | Smith et al. | |
| 7,457,503 B2 | 11/2008 | Solheid et al. | |
| 7,471,869 B2 | 12/2008 | Reagan et al. | |
| 7,499,622 B2 | 3/2009 | Castonguay et al. | |
| 7,515,805 B2 | 4/2009 | Vongseng et al. | |
| 7,519,259 B2 | 4/2009 | Smith et al. | |
| 7,646,958 B1 | 1/2010 | Reagan et al. | |
| 7,720,343 B2 | 5/2010 | Barth et al. | |
| 7,734,138 B2 | 6/2010 | Bloodworth et al. | |

(Continued)

FOREIGN PATENT DOCUMENTS

| | | | |
|---|---|---|---|
| JP | 2000-89038 A | * | 3/2000 |
| JP | 2005-300895 A | * | 10/2005 |

OTHER PUBLICATIONS

U.S. Appl. No. 12/781,577, filed May 17, 2010 entitled "Fiber Distribution HUB With Swing Frame and Modular Termination Panels".

(Continued)

*Primary Examiner* — Mike Stahl

(74) *Attorney, Agent, or Firm* — Merchant & Gould P.C.

(57) ABSTRACT

Example embodiments of an installation unit for increasing capacity of a fiber distribution hub include a fiber optic splitter module having multiple splitter pigtails and at least one management module defining slots in which the management module holds at least one of the splitter pigtails. In one embodiment, the management module holds the fiber optic connector of the splitter pigtail. The management module is configured to be removed when the splitter pigtails are inserted into a storage module and/or a termination module provided within the fiber distribution hub.

23 Claims, 19 Drawing Sheets

U.S. PATENT DOCUMENTS

| | | | |
|---|---|---|---|
| 7,809,232 B2 | 10/2010 | Reagan et al. | |
| 7,809,233 B2 | 10/2010 | Smith et al. | |
| 7,809,234 B2 | 10/2010 | Smith et al. | |
| 7,809,235 B2 | 10/2010 | Reagan et al. | |
| 7,816,602 B2 | 10/2010 | Landry et al. | |
| 7,826,705 B2 | 11/2010 | McGranahan et al. | |
| 7,826,706 B2 | 11/2010 | Vongseng et al. | |
| 7,841,775 B2 | 11/2010 | Smith et al. | |
| 7,844,159 B2 | 11/2010 | Solheid et al. | |
| 7,844,161 B2 | 11/2010 | Reagan et al. | |
| 7,873,255 B2 | 1/2011 | Reagan et al. | |
| 2003/0113086 A1* | 6/2003 | Jun et al. | 385/135 |
| 2004/0228598 A1* | 11/2004 | Allen et al. | 385/135 |
| 2006/0165365 A1* | 7/2006 | Feustel et al. | 385/135 |
| 2007/0104448 A1* | 5/2007 | Allen | 385/135 |
| 2010/0124392 A1 | 5/2010 | Reagan et al. | |
| 2010/0226615 A1 | 9/2010 | Reagan et al. | |
| 2011/0019965 A1 | 1/2011 | Smith et al. | |
| 2011/0033158 A1 | 2/2011 | Smith et al. | |
| 2011/0033164 A1 | 2/2011 | Solheid et al. | |
| 2012/0033926 A1* | 2/2012 | de Jong | 385/135 |

OTHER PUBLICATIONS

U.S. Appl. No. 12/897,475, filed Oct. 4, 2010 entitled "Fiber Distribution Device".

U.S. Appl. No. 12/900,129, filed Oct. 7, 2010 entitled "Fiber Distribution HUB With Outside Accessible Grounding Terminals".

* cited by examiner

SPLITTER MODULE WITH CONNECTORIZED PIGTAIL MANAGER

CROSS REFERENCE TO RELATED APPLICATION

The present application claims the benefit of U.S. Provisional Patent Application Ser. No. 61/145,869, filed Jan. 20, 2009, which application is hereby incorporated by reference in its entirety.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown, the network 100 can include a central office 101 that connects a number of end subscribers 105 (also called end users 105 herein) in a network. The central office 101 can additionally connect to a larger network such as the Internet (not shown) and a public switched telephone network (PSTN). The network 100 can also include fiber distribution hubs (FDHs) 103 having one or more optical splitters (e.g., 1-to-8 splitters, 1-to-16 splitters, or 1-to-32 splitters) that generate a number of individual fibers that may lead to the premises of an end user 105. The various lines of the network 100 can be aerial or housed within underground conduits.

The portion of the network 100 that is closest to central office 101 is generally referred to as the F1 region, where F1 is the "feeder fiber" from the central office 101. The portion of the network 100 closest to the end users 105 can be referred to as an F2 portion of network 100. The network 100 includes a plurality of break-out locations 102 at which branch cables are separated out from the main cable lines. Branch cables are often connected to drop terminals 104 that include connector interfaces for facilitating coupling of the fibers of the branch cables to a plurality of different subscriber locations 105.

Splitters used in an FDH 103 can accept a feeder cable F1 having a number of fibers and may split those incoming fibers into, for example, 216 to 432 individual distribution fibers that may be associated with a like number of end user locations. In typical applications, an optical splitter is provided prepackaged in an optical splitter module housing and provided with a splitter output in pigtails that extend from the module. The splitter output pigtails are typically connectorized with, for example, SC, LC, or LX.5 connectors. The optical splitter module provides protective packaging for the optical splitter components in the housing and thus provides for easy handling for otherwise fragile splitter components. This modular approach allows optical splitter modules to be added incrementally to FDHs 103 as required.

SUMMARY

Certain aspects of the disclosure relate to fiber optic cable systems.

In example systems, a fiber distribution system includes one or more fiber distribution hubs (FDHs) that provide an interface between the central office and the subscribers.

Certain additional aspects of the present disclosure relate to fiber distribution hub configurations that allow a field technician to quickly and easily increase capacity of the hub.

Other aspects of the disclosure relate to cable routing configurations.

Certain aspects of the disclosure relate to enhanced access and scalability through the use of modular subscriber termination components and modular splitters.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Figure 1:
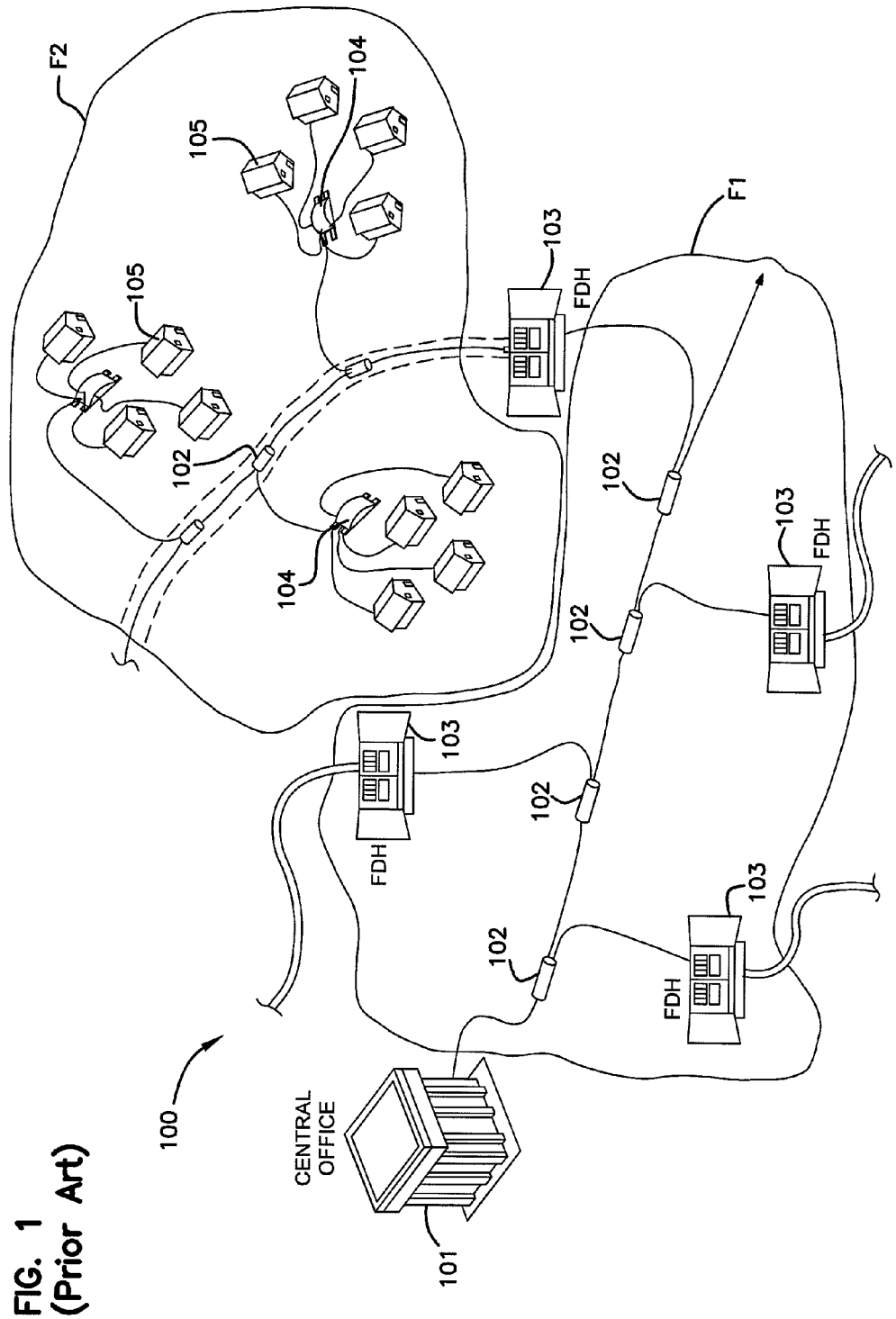
FIG. 1 shows a passive fiber optic network.
Figure 2:
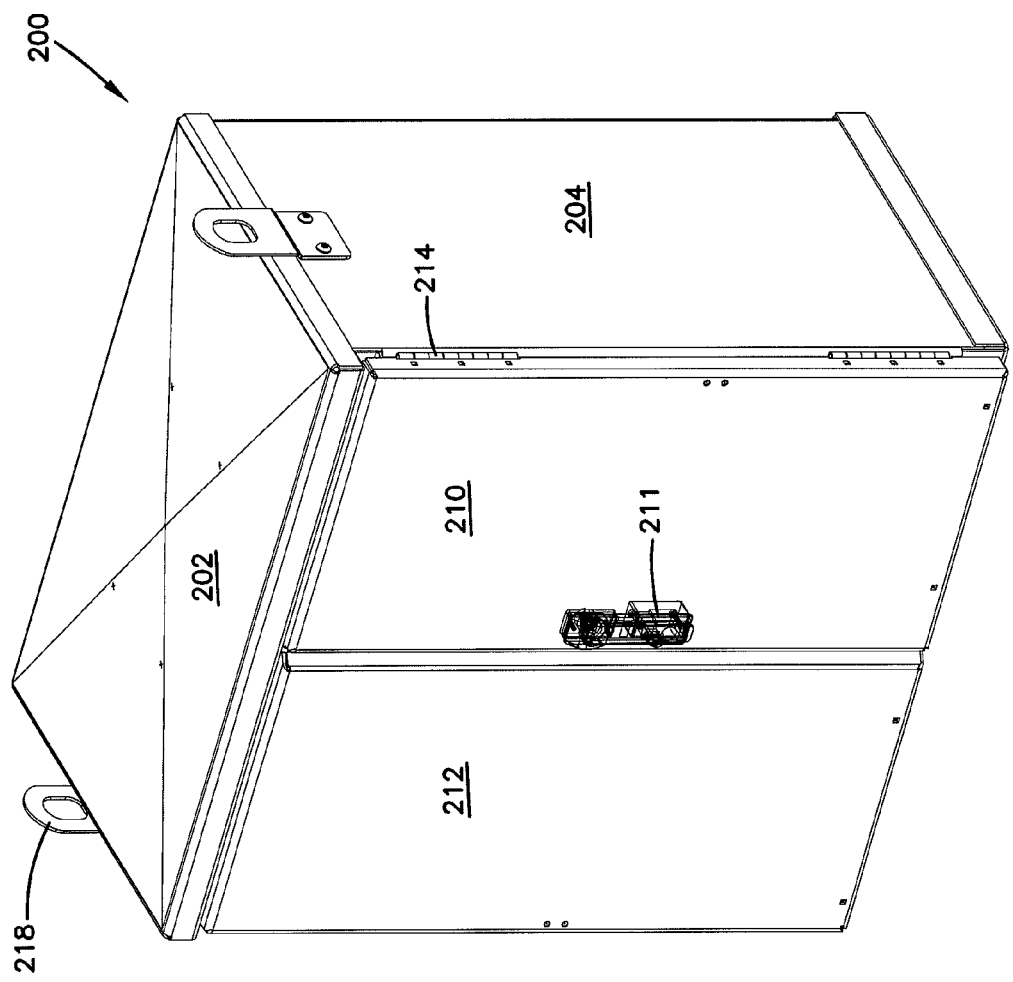
FIG. 2 is a front perspective view of an example fiber distribution hub having a cabinet with doors shown in a closed position in accordance with the principles of the present disclosure.
Figure 3:
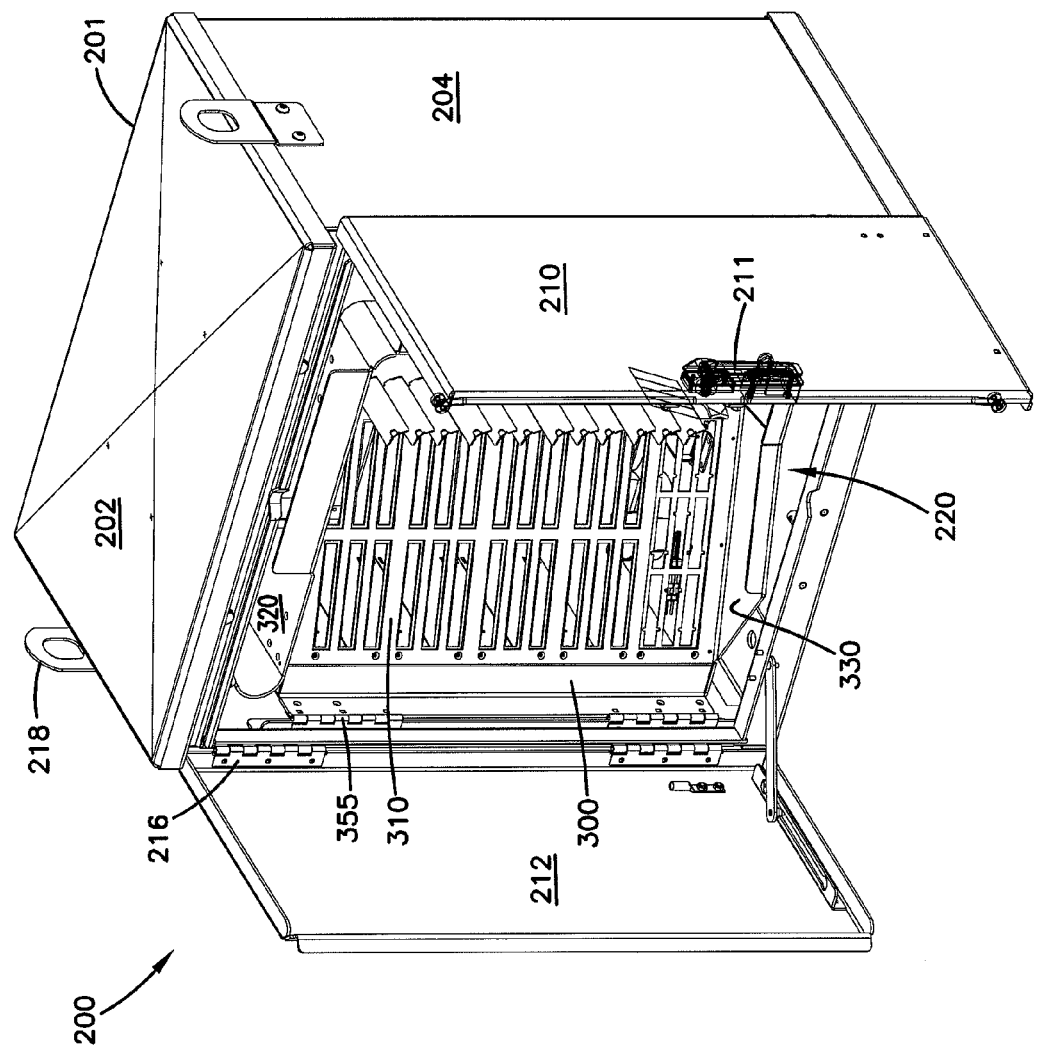
FIG. 3 is a front perspective view of the fiber distribution hub of FIG. 2 with the cabinet doors shown in an open position in accordance with the principles of the present disclosure.

Referring now to FIGS. 2-5, an example fiber distribution hub (FDH) 200 configured in accordance with the principles of the present disclosure is shown. The FDH 200 includes a cabinet 201 that houses internal components. The FDH 200 provides an interconnect interface for optical transmission signals at a location in a telecommunications network where operational access and reconfiguration are desired. The FDH 200 is designed to accommodate a range of alternative sizes and fiber counts and support factory installation of pigtails, fanouts, and splitters.

The FDH 200 generally administers optical connections at a termination location (e.g., a termination panel) between incoming fiber and outgoing fiber in an Outside Plant (OSP) environment. As the term is used herein, "a connection" between fibers includes both direct and indirect connections. Examples of incoming fibers include the feeder cable fibers that enter the cabinet and intermediate fibers (e.g., connectorized pigtails extending from splitters and patching fibers/jumpers) that connect the feeder cable fiber to the termination panel. Examples of outgoing fibers include the subscriber cable fibers that exit the cabinet and any intermediate fibers that connect the subscriber cable fibers to the termination panel. For example, the FDH 200 can be used to split feeder cables and terminate the split feeder cables to distribution cables routed to subscriber locations.

The cabinet 201 of the FDH 200 includes a top panel 202, a bottom panel 203, a right side panel 204, a left side panel 206, a rear panel 205 that define an interior. The cabinet 201 defines an access opening (see FIG. 3) leading to the interior. At least one door is mounted to the cabinet 201 to cover the access opening when the door is arranged in a closed position. For example, the at least one door can be pivotally mounted to the cabinet 201 using hinges 214, 216 to facilitate access to the components mounted within the cabinet 201. In some embodiments, the at least one door includes a right door 210 and a left door 212. In one embodiment, the doors 210, 212 include a lock 211.

The FDH 200 can be provided in pole mount or pedestal mount configurations. In general, the cabinet 201 of the FDH 200 is configured to protect the internal components against rain, wind, dust, rodents and other contaminants. However, the cabinet 201 remains relatively lightweight for easy installation, and breathable to prevent accumulation of moisture in the unit. In some embodiments, an aluminum construction with a heavy powder coat finish also provides for corrosion resistance. In one example embodiment, the cabinet 201 is manufactured from heavy gauge aluminum and is NEMA-4X rated. In other embodiments, however, other materials can also be used.

A swing frame 300 is pivotably mounted within the cabinet 201. In the example shown in FIGS. 3 and 4, the swing frame 300 is mounted to the cabinet 201 on hinges 355. The swing frame 300 divides the cabinet 201 into a front portion 220 (see FIG. 3) and a rear portion 230 (see FIG. 4). The rear portion 230 of the cabinet 201 includes one or more openings through which a feeder cable (e.g., or F1 cable) 700 and a subscriber cable 708 enter and exit the cabinet 201 (see FIG. 4). Accordingly, one or more feeder cable interfaces can be positioned within the rear portion 230 of the cabinet 201. In certain embodiments, distribution/subscriber cable interfaces also can be positioned within the rear portion 230 of the cabinet 201.

Cable management devices, including fanout devices, can be mounted to the interior of the cabinet 201. For example, one or more cabinet fanout devices can be used to separate out a single jacketed stub cable that enters the cabinet 201 into two or more fibers. The incoming stub cable can be spliced to a feeder cable 700 outside of the cabinet 201. One or more cabinet fanout devices also can be used to reduce multiple loose subscriber cable fibers into a single jacketed stub cable that exits the cabinet 201. The outgoing stub cable can be spliced to a subscriber distribution cable outside of the cabinet 201. In various embodiments, the stub cables can range in length from about 25 feet to about 300 feet. In other embodiments, the feeder cable 700 and the distribution cable 708 can be routed into the cabinet 201 and spliced or otherwise connected to the appropriate intermediate fibers 702, 708.

Figure 7:
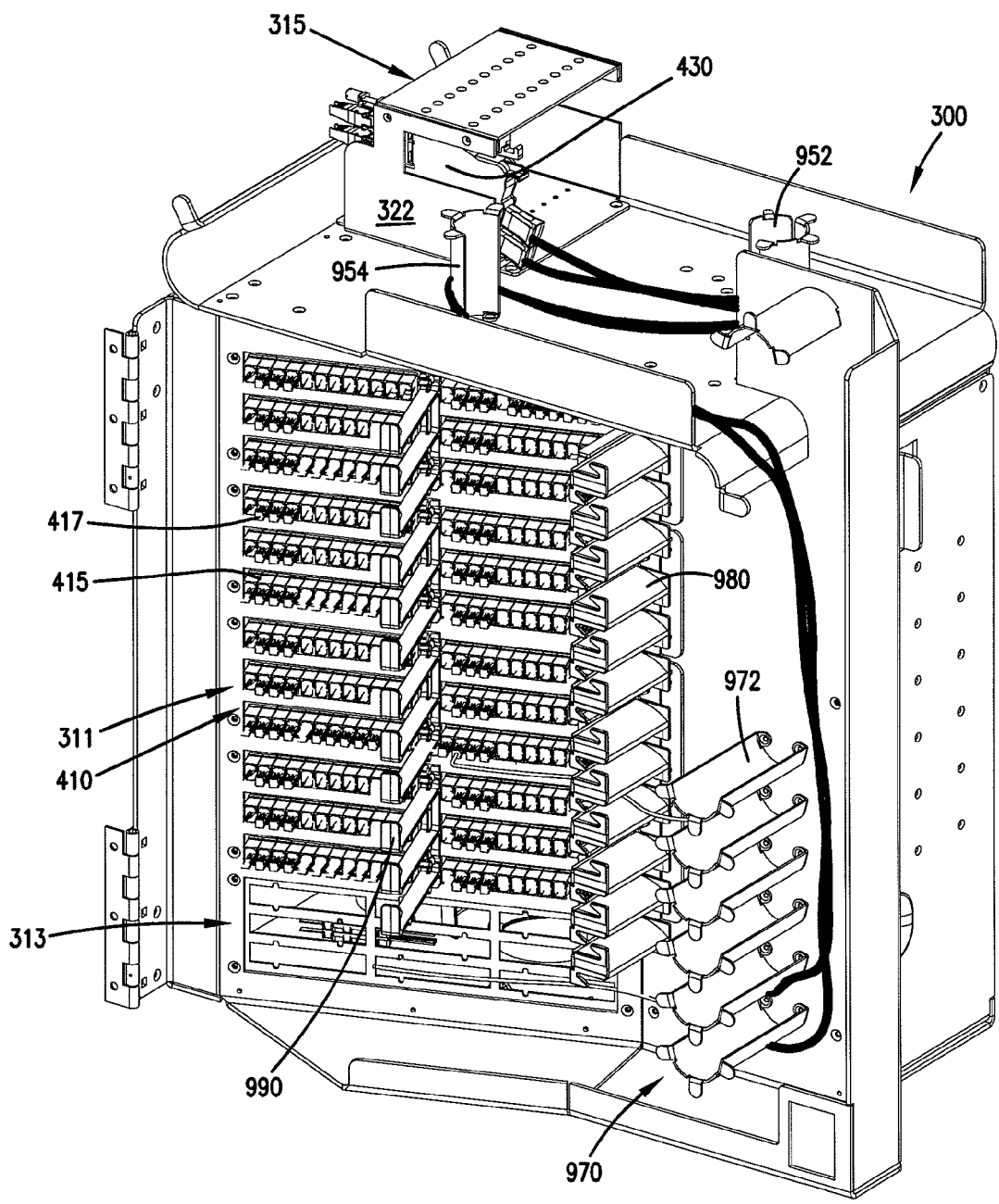
FIG. 7 is a front perspective view of the swing frame of FIG. 6 with multiple termination modules and one splitter module installed on the swing frame and one example splitter pigtail routed from the splitter module to an adapter of one of the termination modules in accordance with the principles of the present disclosure.

The swing frame 300 includes a termination region 311 and a storage region 313. Generally, at least one termination module 410 (see FIG. 7) is provided at the termination region 311 and at least one storage module 420 (see FIG. 8) is provided at the storage region 313. In addition, the swing frame can include a splitter region 315 (FIG. 7). At least one splitter module housing 322 accommodating one or more splitter modules 430 is positioned on the swing frame 300 at the splitter region 315. In some embodiments, the swing frame 300 also is configured for cable management.

Figure 4:
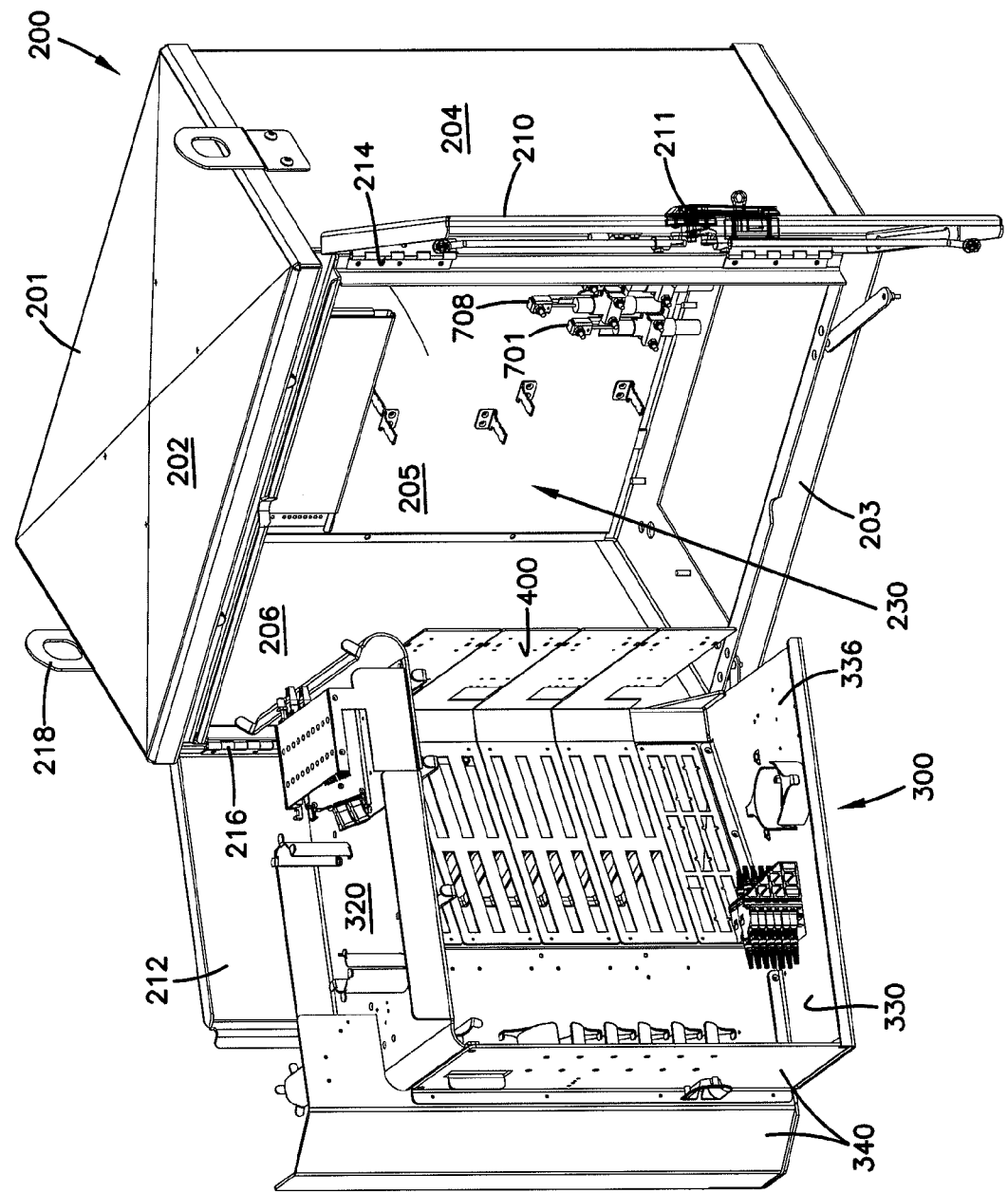
FIG. 4 is a front perspective view of the fiber distribution hub of FIG. 2 with a swing frame swung out of the cabinet in accordance with the principles of the present disclosure.

The swing frame 300 has a first side 302 and an opposite second side 304. In the example shown, the first side 302 is a front side of the swing frame 300 and the second side 304 is a rear side. When the swing frame 300 is arranged in the open position, as shown in FIG. 4, components in the second side 304 of the swing frame 300 are accessible. In certain embodiments, the termination region 311 and the storage region 313 are arranged on the first side 302 and one or more cable interfaces (e.g., feeder cable interface, distribution cable interface, etc.) are arranged on the second side 304 of the swing frame 300. Cable management structures are provided on both the first and second sides 302, 304, respectively, of the swing frame 300. Examples of cable management structures include a fiber spool, one or more radius bend limiters, one or more fiber clips, and other such devices. In the example shown, the front side 302 of the swing frame 300 forms a trough configured to retain slack or excess fiber from the storage region 313.

In some embodiments, the splitter region 315 is located on a top of the swing frame 300. Accordingly, the splitter modules 430 located in the splitter module housing 322 (see FIG. 4) are accessible when the swing frame 300 is swung out of the cabinet 201. In contrast, when the swing frame 300 is arranged in the closed position (see FIG. 3), only components on the front portion 302 of the swing frame 300 are readily accessible. In other embodiments, however, the various regions can be otherwise arranged on the swing frame 300.

In example embodiments, the swing frame 300 includes a release latch (not shown) that locks the swing frame 300 in a closed position within the cabinet 201 of the FDH 200 until the release latch is actuated. Once the release latch is actuated, the swing frame 300 can be pivoted out of the cabinet 201. In addition, a pivoting locking member (not shown) can be mounted to the second side 304 of the swing frame 300 to maintain the swing frame 300 in the open position.

Figure 5:
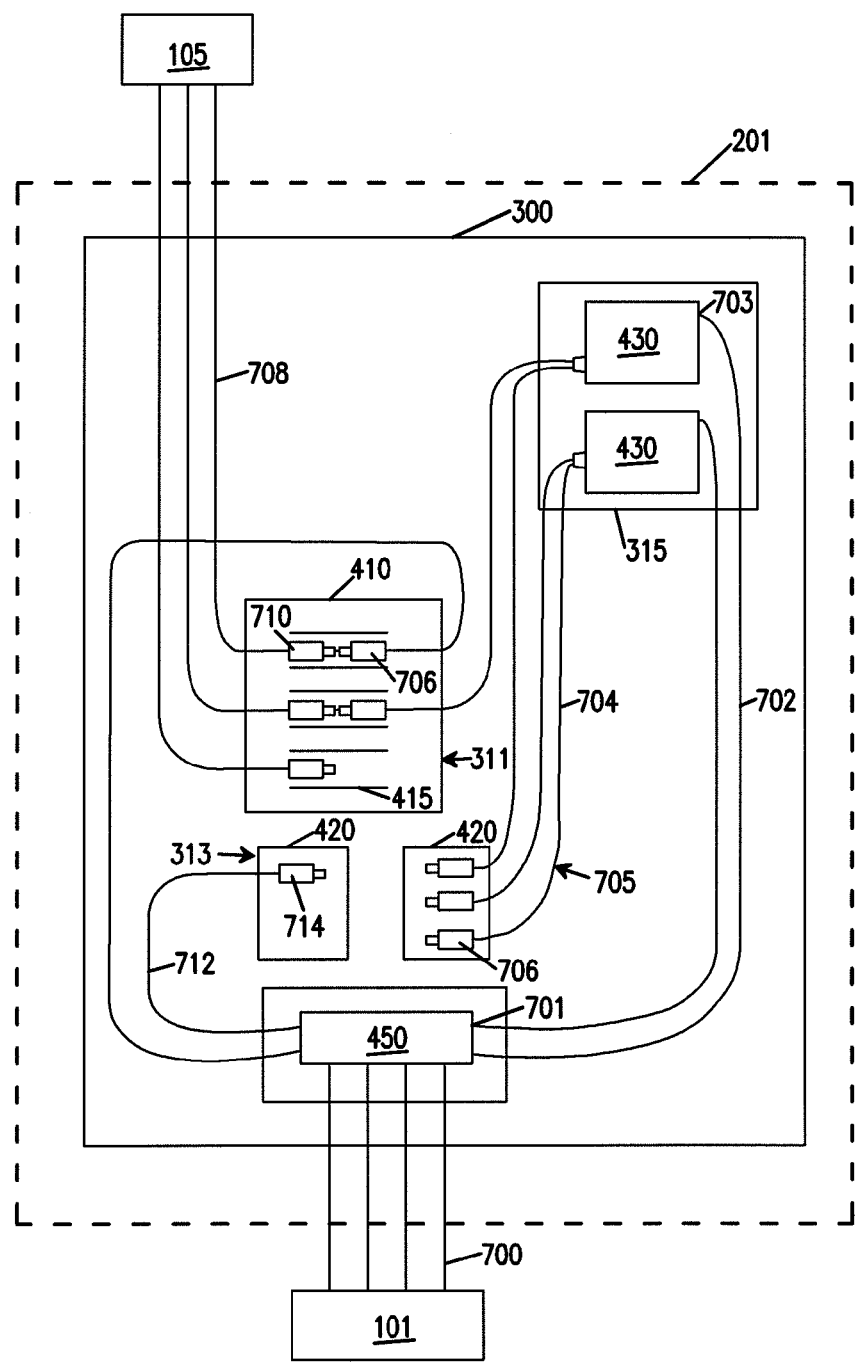
FIG. 5 is a schematic diagram showing an example cable routing scheme for the fiber distribution hub of FIG. 2 in accordance with the principles of the present disclosure.

FIG. 5 is a schematic diagram showing an example cable routing scheme for the FDH 200. A feeder cable 700 is initially routed into the FDH 200 through the cabinet 201 (e.g., typically through an opening defined in the rear or bottom of the cabinet 201 as shown in FIG. 4). In certain embodiments, the fibers of the feeder cable 700 can include ribbon fibers. An example feeder cable 700 can include twelve to forty-eight individual fibers connected to a service provider central office 101 (FIG. 1).

In some embodiments, after entering the cabinet 201, the fibers of the feeder cable 700 are routed to a feeder cable interface 450 (e.g., fiber optic adapter modules, a splice tray, etc.). At the feeder cable interface 450, one or more of the fibers of the feeder cable 700 are individually connected to separate splitter input fibers 702. The splitter input fibers 702 are routed from the feeder cable interface 450 to the splitter module housing 322. At the splitter module housing 322, the splitter input fibers 702 are connected to separate splitter modules 430. Each splitter module splits the respective input fibers 702 into multiple pigtails 705. Each pigtail 705 includes at least one optical fiber 704 and a connectorized end 706. In one embodiment, the optical fiber 704 of each pigtail 705 includes a jacketed optical fiber. In other embodiments, however, the fibers of the feeder cable 700 can be connectorized and can be routed directly to the splitter modules 430 thereby bypassing or eliminating the need for an intermediate feeder cable interface 450.

When the pigtails 705 are not in service, the connectors 706 can be temporarily stored on a storage module 420 that is mounted at the storage region 313 of the swing frame 300. When the pigtails 705 are needed for service, the fibers 704 of the pigtails 705 are routed from the splitter modules 430 to a termination module 410 that is provided at the termination region 311 of the swing frame 300. At the termination module 410, the connectors 706 of the pigtails 705 are optically interfaced with the fibers of a distribution cable 708. A typical distribution cable 708 forms the F2 portion of a network (see FIG. 1) and typically includes a plurality of fibers (e.g., 144, 216 or 432 fibers) that are routed from the FDH 200 to subscriber locations 709. Accordingly, the termination region 311 is the dividing line between the incoming fibers and the outgoing fibers.

In some embodiments, one or more of the fibers of the feeder cable 700 are not connected to any of the splitter modules 430. Rather, these fibers of the feeder cable 700 are connected to pass-through fibers 712 having connectorized ends 714. The pass-through fibers 712 are connected to the termination modules 410, without first connecting to the splitter modules 430. By refraining from splitting a fiber 712, a stronger signal can be sent to one of the subscribers. The connectorized ends 714 of the pass-through fibers 712 can be stored at the storage region 313 when not in use.

Pivotally mounting the swing frame 300 within the cabinet 201 enable the entirety of the swing frame 300, including the termination modules 410, the storage modules 420, the feeder cable interface device 450, and the splitter modules 430, to be swung out of the front doors 210, 212 of the cabinet 201. Pivoting the swing frame 300 out of the cabinet 201 enables access to optical components in the rear portion 230 of the cabinet 201 and on the rear of the swing frame 300 for cleaning, testing, maintenance, additions, etc. In the example shown, pivoting the swing frame 300 out of the cabinet 201 causes the right side of the swing frame 300 to move away from the interior volume of the cabinet 201. In some example embodiments, the swing frame 300 can be pivoted ninety degrees or more out of the cabinet 201.

In certain embodiments, the hinges 355 of the swing frame 300 are positioned to provide a single point of flex for fiber cables routed to the swing frame 300. This hinge point is constructed to control the fiber bend. In particular, the hinges 355 and cable management devices are designed to ensure that manufacture recommended bend radii are maintained when the swing frame 300 is opened and closed. In one embodiment, the cabinet 201 can be configured at a factory, or plant, so as to have cable bundles dressed around the hinges 355. Preconfiguring the cabinet 201 prior to deployment reduces the chance that cabling will be done incorrectly.

Figure 6:
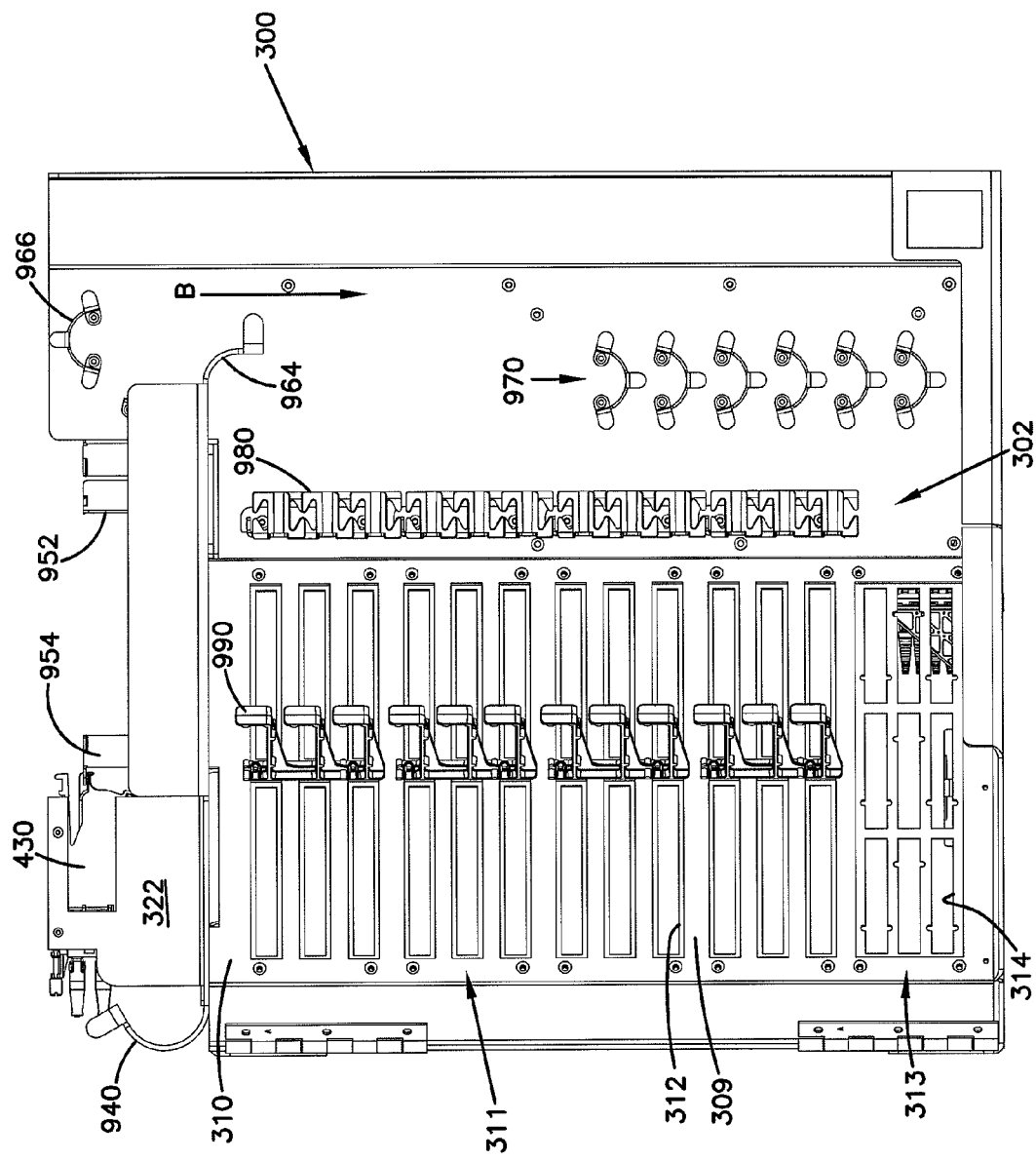
FIG. 6 is a front view of the swing frame of FIG. 4 isolated from the fiber distribution hub in accordance with the principles of the present disclosure.
Figure 8:
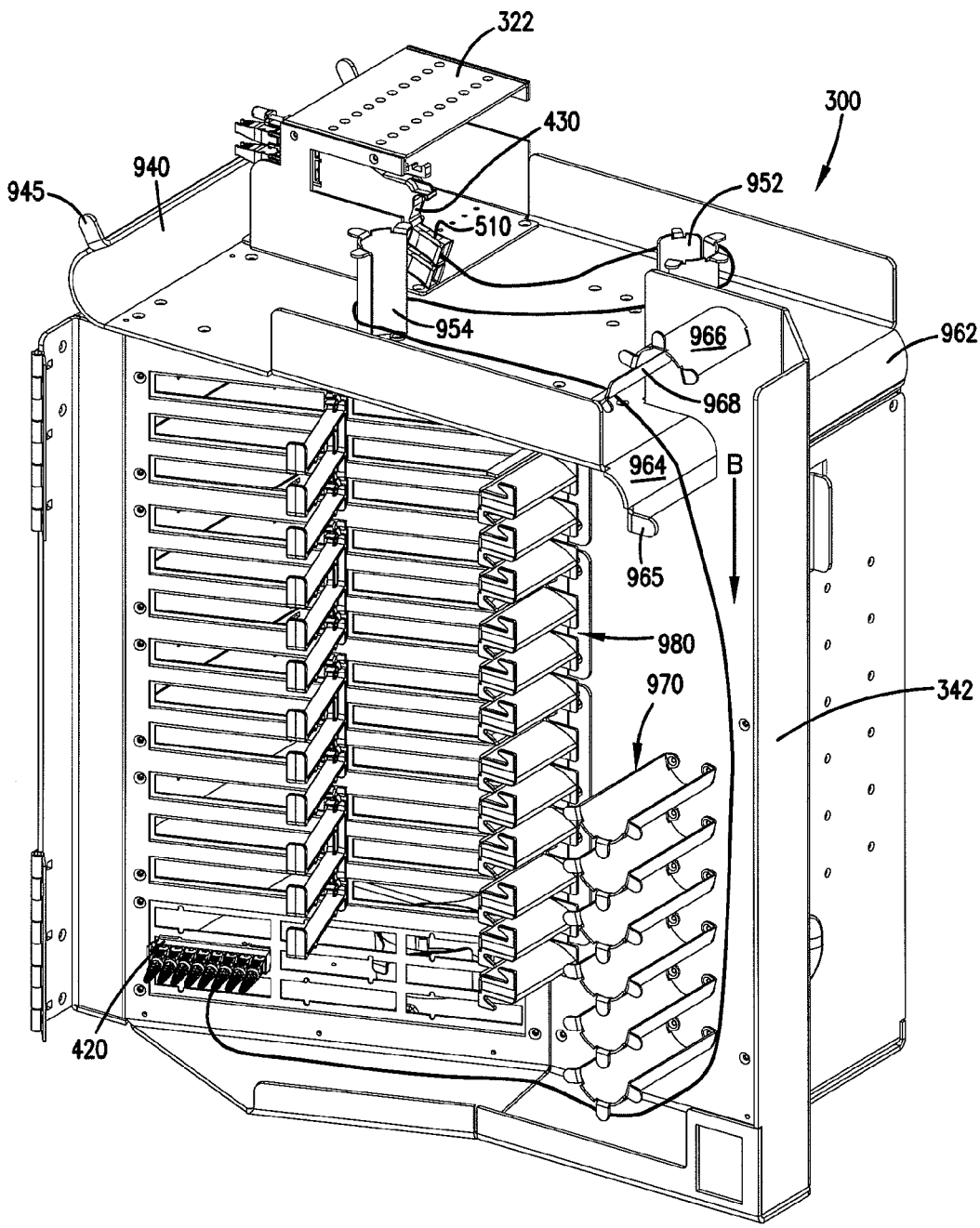
FIG. 8 is a front perspective view of the swing frame of FIG. 6 with one storage module and one splitter module installed on the swing frame and one example splitter pigtail routed from the splitter module to the storage module in accordance with the principles of the present disclosure.

Referring to FIGS. 6-8, the termination region 311 of the swing frame 300 includes a panel 310 that defines at least one opening 312. One or more adapters 415 of a termination module 410 extend through the opening 312 when the termination module 410 is installed on the swing frame 300 (see FIG. 7). In the embodiment shown in FIG. 6, the termination region 311 includes two columns of openings 312 with each column including twelve elongated slots. Strips 309 separate the openings 312 of each column and provide surface area for adhering labeling information (e.g., connector designation). When the cabinet 201 is deployed, at least one termination module 410 is installed on the swing frame 300. As time passes and the number of subscribers increases, additional termination modules 410 can be installed on the swing frame 300.

In general, each termination module 410 includes one or more adapters 415 configured to receive and optically couple together two optical connectors. In some example embodiments, each termination module includes a panel defining one or more openings in which fiber optic adapters 415 are mounted. The panels can be incrementally mounted to the panel 310 to increase subscriber capacity of the cabinet 201. In other example embodiments, each termination module 410 includes an integral housing (not shown) defining the one or more adapters. The integral housing can be inserted into the openings 312 defined in the panel 310.

In some embodiments, each termination module 410 is precabled at the factory to include a connectorized distribution fiber 708 coupled to each adapter 415. Dust caps 417 are generally provided on the front ends of the adapters 41 to protect the terminated distribution fibers 708 from dust, dirt, and other contaminants. The connector 710 of each distribution fiber 708 is mounted within the rear end of an adapter 415 and the distribution fibers 708 are routed from the connector 710 to fanouts or other cable management structures provided on the rear of the swing frame 300. In still other embodiments, the termination module 410 is not precabled and dust caps 417 are also provided on the rear ends of the adapters 415 to protect the adapters 415.

In certain embodiments, the termination modules include sliding adapter packs. For example, information regarding such termination modules can be found in U.S. Pat. No. 7,194,181, titled "Adapter Block Including Connector Storage;" and U.S. Pat. Nos. 5,497,444; 5,717,810; 5,758,003; and 6,591,051, the disclosures of which are hereby incorporated by reference.

The storage region 313 also defines one or more openings 314 into which storage modules 420 (see FIG. 8) can be mounted. In the example shown, the storage region 313 of the swing frame 300 is located below the termination region 311. In other embodiments, however, the storage region 313 can be located above or adjacent to the termination region 311. The openings 314 can be arranged in any desired configuration within the storage region 313. In the example shown in FIG. 8, the storage region 313 defines nine openings 314 arranged in a rectangular pattern.

In certain embodiments, each storage module 420 is designed to snap into one of the openings 314 defined in the storage region 313. Each storage module 420 includes a body 421 having a front side 422 and a rear side 423. The body 421 is configured to hold at least one fiber connector 706. Typically, the body 421 is configured to hold about eight connectors 706. In some embodiments, the body 421 is arranged to retain the fiber connectors 706 in a single row configuration. In other embodiments, the body 421 can be arranged to hold the connectors 706 in a square pattern or in any other desired configuration.

In certain embodiments, each storage module 420 defines one or more openings 424 in which to hold the pigtail connectors 706. In one embodiment, each opening 424 is configured to retain a pigtail connector 706 with a dust cap 707 mounted over the ferrule of the pigtail connector 706. In one embodiment, each opening 424 extends from the front side 422 of the storage module 420 to the rear side 423 to define a passage configured to receive a connector 706 from only the front side 422. In another embodiment, each opening 424 does not extend entirely through the storage housing 421. More information regarding example storage modules 420 can be found in U.S. Pat. No. 7,198,409, titled "Fiber Optic Connector Holder and Method"; U.S. Pat. No. 7,233,731, titled "Telecommunications Connection Cabinet;" and U.S. Pat. No. 7,218,827, titled "Multi-position Fiber Optic Connector Holder and Method," the disclosures of which are hereby incorporated by reference.

The splitter module housing 322 serves to protect, organize, and secure the splitter modules 430 of the FDH 200. The splitter module housing 322 can be constructed in various sizes to accommodate different numbers of splitter modules 430. The splitter module housing 322 is generally rectangular and defines one or more locations within the open interior sized to accept one or more optical splitter modules 430. To accommodate the splitter modules 430, the module housing 322 includes structure for supporting/securing the splitter modules 430. In example embodiments, the splitter modules 430 are designed to snap into the splitter module housing 322. In one embodiment, the splitter modules 430 are loaded into the splitter module housing 322 from front to back.

The module housing 322 is further configured to enable the splitter modules 430 to receive an input fiber, such as a fiber of the feeder cable 700 or an input fiber 702 (FIG. 5), on one end of the splitter module 430 and to output multiple fibers, such as pigtails fibers 704 (FIG. 5), from the opposing end of the splitter 430. The feeder cable 700 can be interfaced with splitter inputs 702 using at least one cable interface device 450 (FIG. 5).

Figure 9:
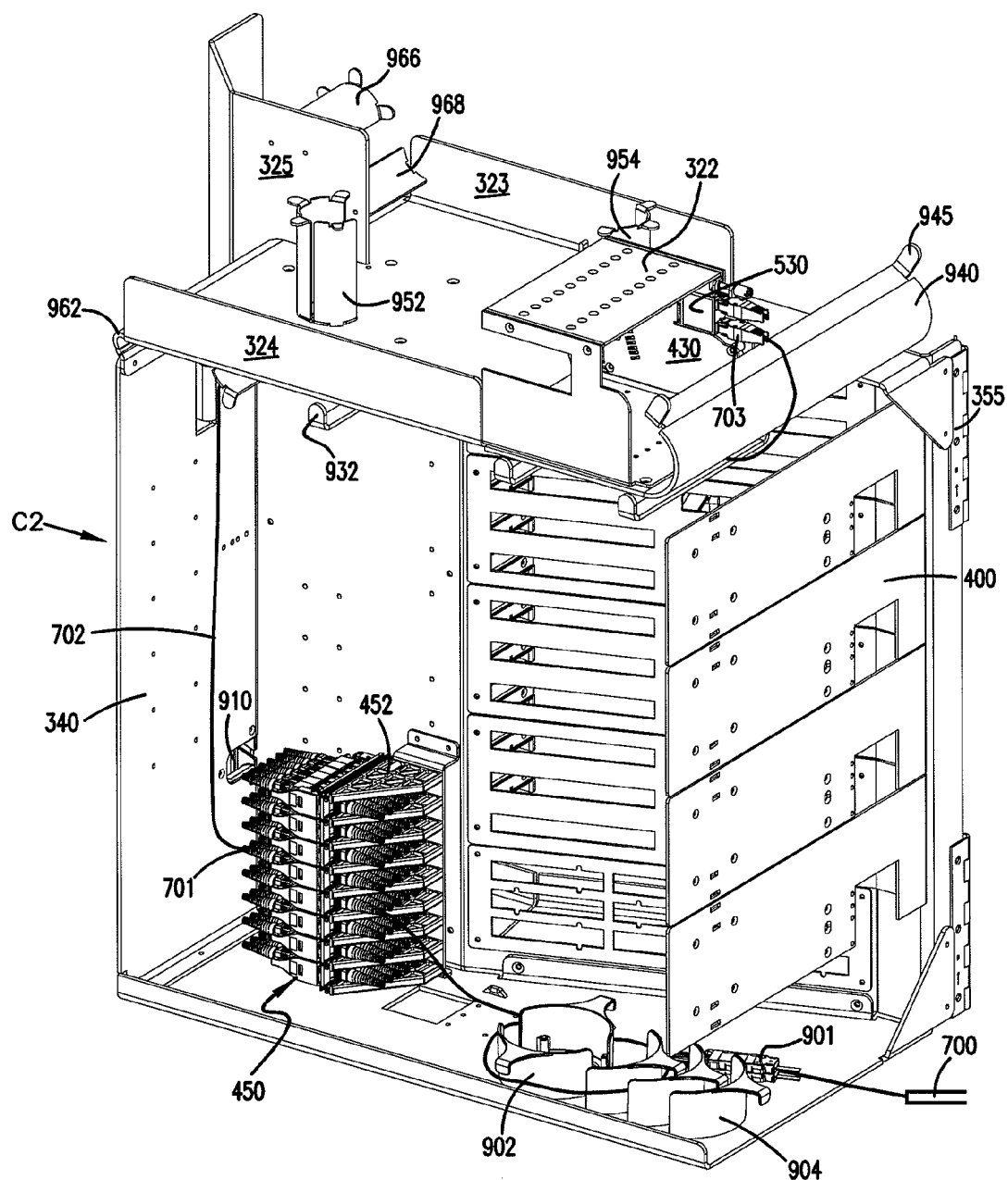
FIG. 9 is a rear perspective view of the swing frame of FIG. 6 with an adapter pack type of feeder cable interface and one splitter module installed on the swing frame and one example splitter input fiber routed from the adapter pack to the splitter module in accordance with the principles of the present disclosure.

FIG. 9 is a rear perspective view of the swing frame 300 configured to interface a connectorized feeder cable 700 with a splitter module 430 through intermediate splitter input fibers 702. In FIG. 9, each splitter input fibers 702 has a connectorized end 701 that interfaces with a connectorized end of a fiber of the feeder cable 700 at an adapter module 452. Information regarding the adapter module 452 can be found in U.S. Pat. No. 7,194,181, titled "Adapter Block Including Connector Storage," the disclosure of which is hereby incorporated by reference herein. Additional information can be found in U.S. Pat. Nos. 5,497,444; 5,717,810; 5,758,003; and 6,591,051, the disclosures of which are hereby incorporated by reference herein.

Figure 10:
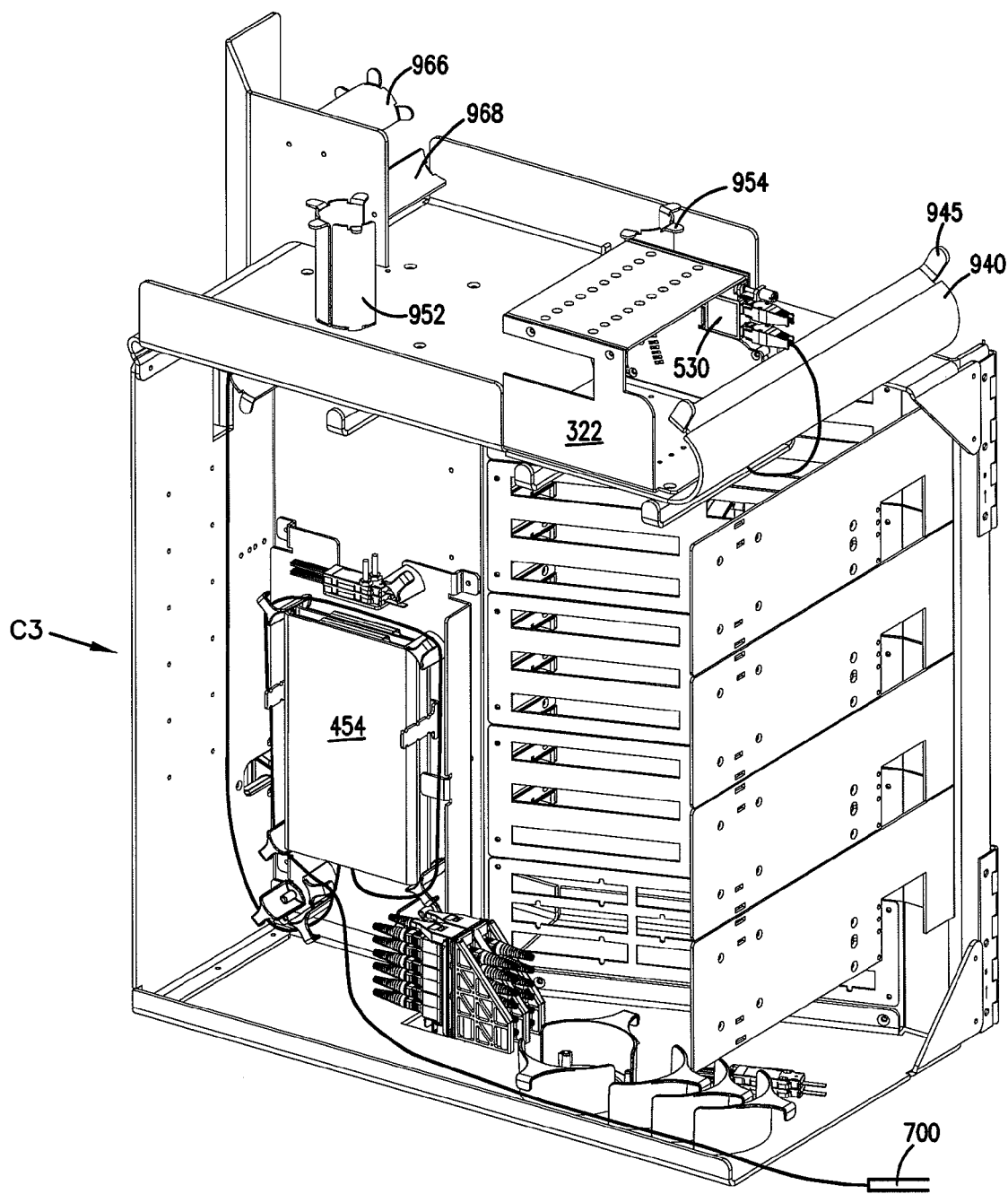
FIG. 10 is a rear perspective view of the swing frame of FIG. 6 with a splice tray type of feeder cable interface and one splitter module installed on the swing frame and one example splitter input fiber routed from the splice tray to the splitter module in accordance with the principles of the present disclosure.

In contrast, FIG. 10 is a rear perspective view of the swing frame 300 configured to interface an unconnectorized feeder cable 700 with a splitter module 430 through intermediate splitter input fibers 702. In order to connect the feeder cable 700 to the unconnectorized fiber inputs 702, a splice tray 454 is provided at the second side 304 of the swing frame 300 in FIG. 10. The feeder cable 700 is spliced to the unconnectorized second ends 701 of the splitter input fibers 702.

Figure 11:
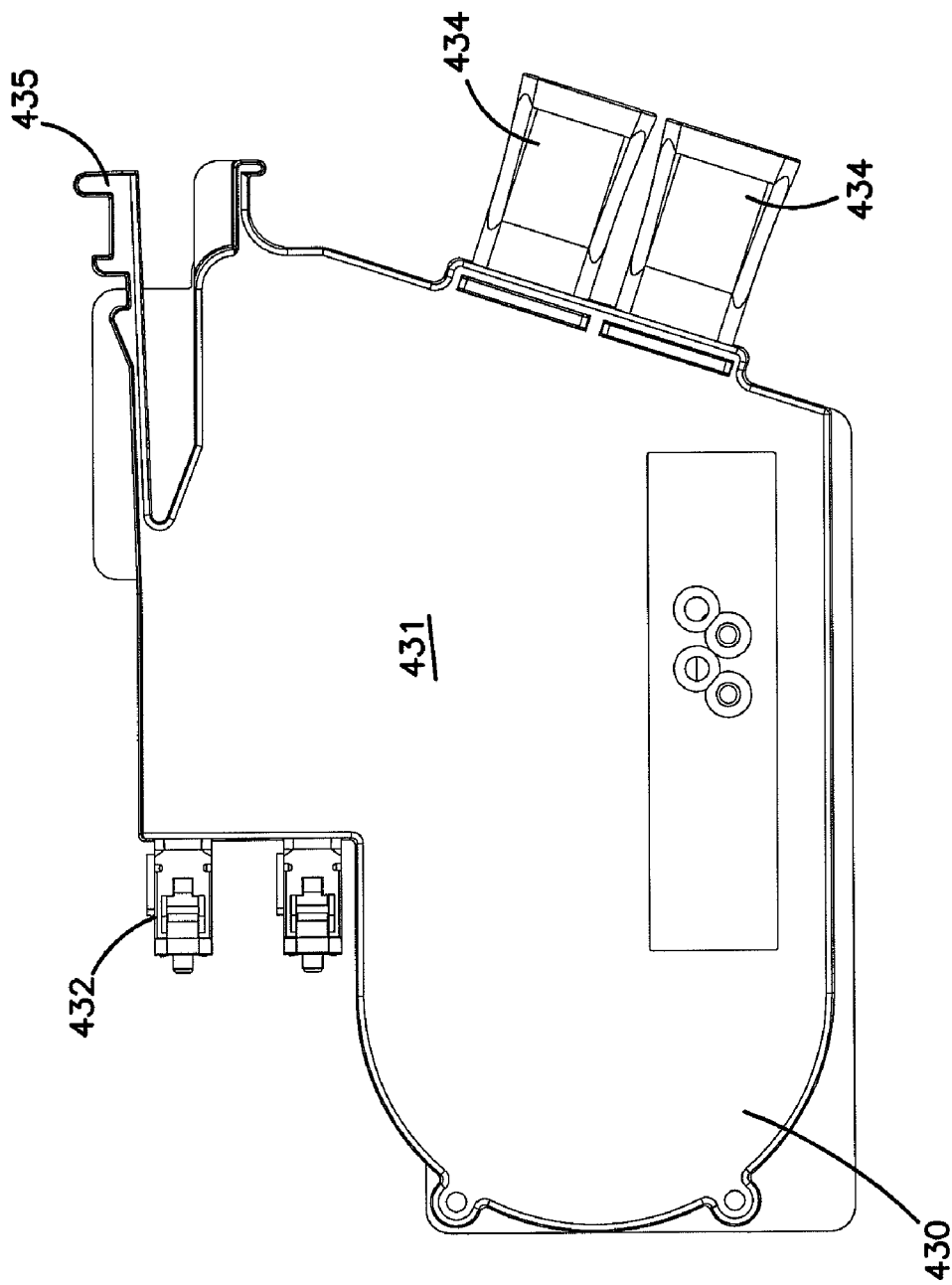
FIGS. 11-13 show one example of a splitter module configured to mount to the distribution hub of FIG. 2 in accordance with the principles of the present disclosure.
Figure 12:
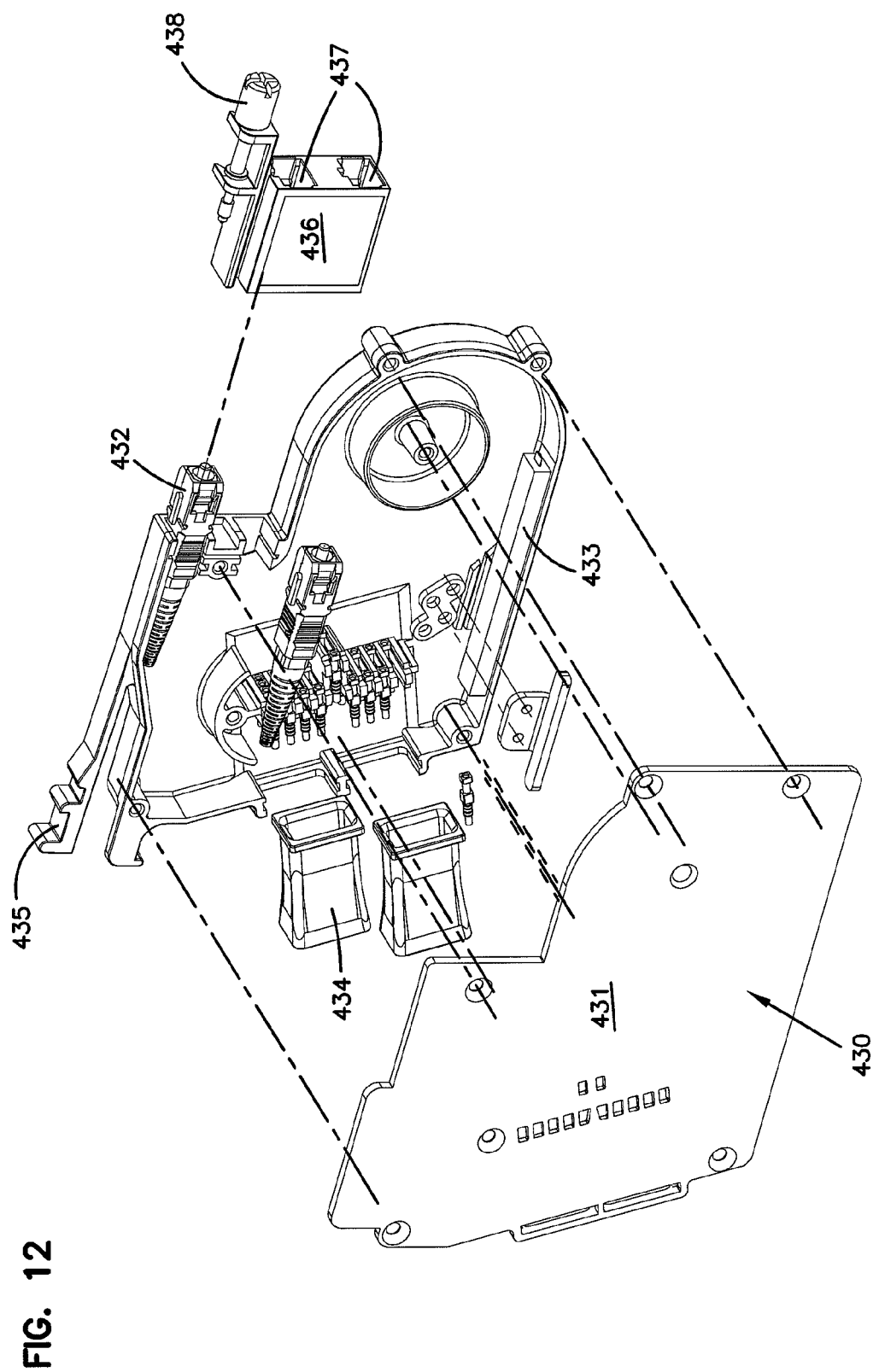
Figure 13:
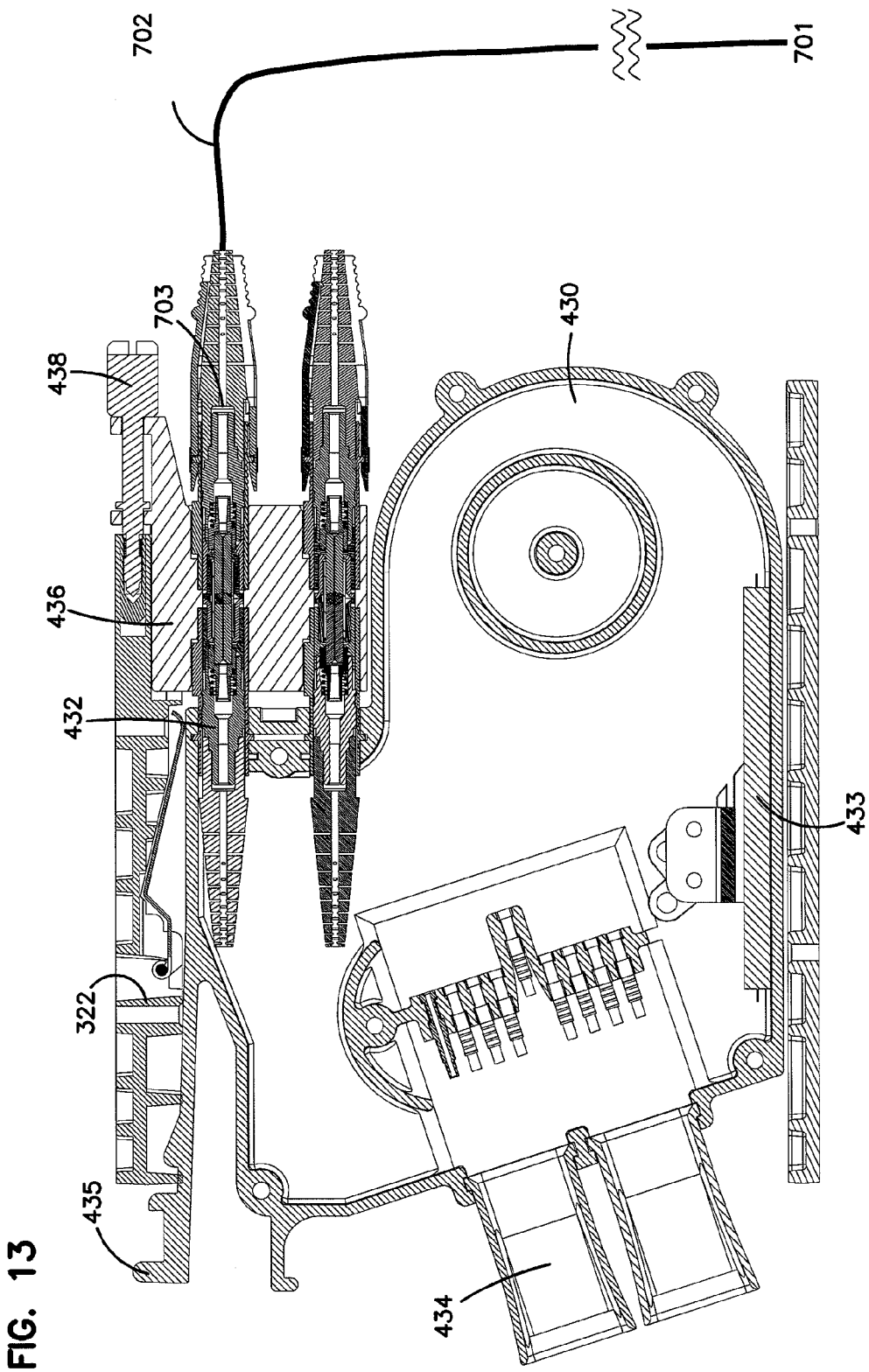

Referring now to FIGS. 11-13, one type of splitter module 430 that can be mounted in the splitter module housing 322 is a splitter having an integral connector. FIG. 11 is a left side view of such a splitter module 430. The splitter module 430 includes a housing 431 having at least one protective boot 434 protruding frontwardly and at least one integral connector 432 protruding rearwardly. In the embodiment shown, two boots 434 protrude from the front and two integral connectors 432 protrude rearwardly from the splitter housing 431. In one example embodiment (not shown), each splitter has four integral connectors 432. In some embodiments, a handle 435 also protrudes from the front end of the splitter housing 431. FIG. 12 is an exploded view of the splitter module 430 of FIG. 11 showing the internal components of the splitter module 430 including an optical splitter 433.

FIG. 13 shows a cross-section of the splitter module 430 of FIG. 11 inserted in the splitter module housing 322. An adapter assembly 436 is secured to the splitter module housing 322 using a fastener 438. In one embodiment, adapter assemblies 436 are mounted at the backside of the splitter module housing 322. The adapter assembly 436 is configured to receive the connectors 432 of the splitter module 430 when the splitter module 430 is inserted into the splitter module housing 322. As shown, the adapter assembly 436 defines at least one opening 437 that is configured to receive an opposing connector associated with the feeder cable 700 (FIG. 5). In some embodiments, the adapter assembly 436 receives a connector 703 terminating a splitter input fiber 702. In other embodiments, the adapter assembly 436 receives a connector 701 terminating the feeder cable 700, itself. In this way, the feeder cable fibers 700 can be readily coupled to the splitter modules 430.

Other embodiments of splitter modules 430 do not include integral connectors 432. In such embodiments, adapter assemblies 436 are not mounted at the splitter module housing 322 and the feeder cables 700 cannot be plugged directly into the splitter modules 430. Rather, input pigtails pass through the splitter housing 431 and enter the splitter module 430. The opposing ends of the input pigtails are interfaced with the input fibers 702 at the feeder cable interface 450 as described above.

Typically, each splitter module 430 receives between one and four fibers and outputs between two and sixteen fibers 704 for every input fiber. In one example embodiment, four input fibers 702 enter a splitter module 430 and thirty-two pigtail fibers 704 exit the splitter module 430. Further information regarding the splitter module 430 can be found in U.S. Pat. No. 7,418,181, entitled "Fiber Optic Splitter Module", which is hereby incorporated by reference. Additional information on other types of splitter modules can be found at U.S. Pat. No. 7,376,322, entitled "Fiber Optic Module And System Including Rear Connectors;" U.S. Pat. No. 7,400,813, entitled "Fiber Optic Splitter Module;" U.S. Pat. No. 7,346,254, entitled "Fiber Optic Splitter Module With Connector Access;" and U.S. Pat. No. 7,245,809, entitled "Splitter Modules For Fiber Distribution Hubs," the disclosures of which are hereby incorporated by reference herein.

Referring now to FIGS. 14-21, splitter modules 430 can be incrementally added to the swing frame 300 to increase subscriber capacity of the cabinet 201. As the term is used herein, incrementally adding splitter modules 430 refers to adding an appropriate number of splitter modules 430 to the cabinet 201 after the initial deployment of the cabinet 201. The appropriate number of splitter modules 430 is determined based on the number of additional subscribers to be serviced by the cabinet 201. Splitter modules 430 can be added to the cabinet 201 at various times over the life of the cabinet 201.

Figure 14:
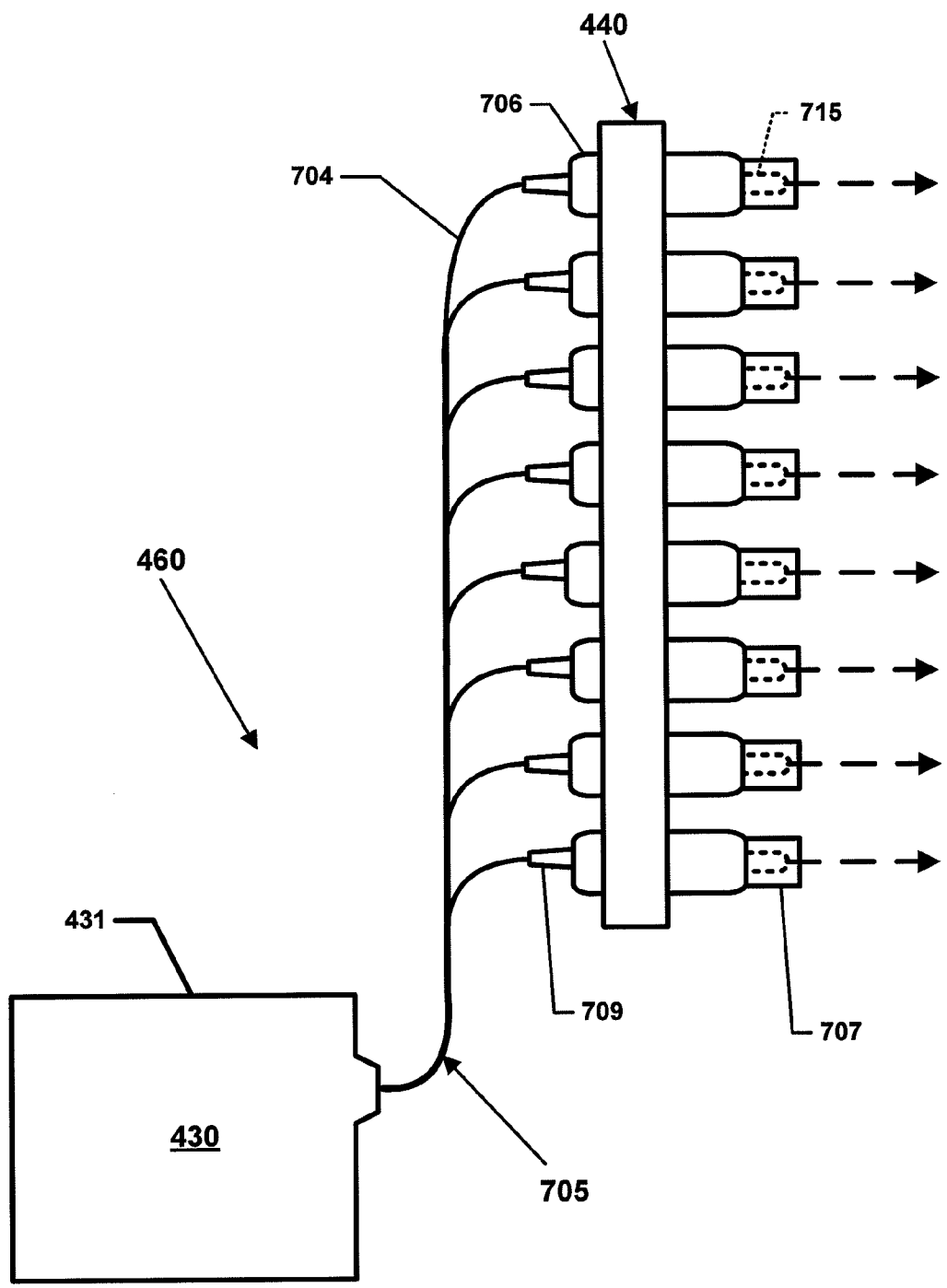
FIG. 14 is a schematic block diagram of an installation unit including a splitter module having pigtails and a management module configured to retain and organize the pigtails of the splitter module in accordance with the principles of the present disclosure.

FIG. 14 illustrates a splitter module 430 configured to be incrementally added to a cabinet 201. The splitter module 430 includes multiple connectorized pigtails 705 exiting from a protective boot 434 on the splitter module 430. Each splitter pigtails 705 includes at least one fiber 704 terminated at a fiber optic connector 706. In one embodiment, each pigtail 705 includes a single, upjacketed optical fiber. The connector 706 includes a ferrule 715 that extends along an insertion axis $A_I$. In certain embodiments, dust caps 707 are provided on the pigtail connectors 706 to cover and protect the ferrules 715 from dust or other contaminants.

The pigtails 705 of the splitter module 430 can be arranged and retained in one or more management modules 440 to form an installation unit 460 prior to installation of the splitter module 430 on the swing frame 300. In certain embodiments, the pigtails 705 are secured in a management module 440 before the splitter module 430 leaves the factory. The management modules 440 organize the pigtails 705 to enable easy identification of the pigtail connectors 706 and to inhibit tangling of the pigtail fibers 704.

In some embodiments, the pigtails 705 of each splitter module 430 are routed to at least two management modules 440. In certain implementations, a first management module includes a management housing 441 defining slots 442 in which the first management module 440 holds at least one splitter pigtail 705 and a second management module 440 includes a second management housing 441 defining slots 442 in which the second management module 440 holds at least a portion of the splitter pigtails 705. In one embodiment, the pigtails 705 of each splitter module 430 are routed to four management modules 440, each management module 440 holding eight connectors 706. In other embodiments, however, an installation unit can include greater or fewer management modules 440 that are configured to hold greater or fewer numbers of pigtail connectors 706. In certain implementations, a second plurality of splitter pigtails 705 extends outwardly from the splitter housing 430. Each of splitter pigtails 705 of the second plurality is terminated by a fiber optic connector 706. A third management module 440 includes a third management housing 441 defining slots 442 in which the third management module 440 holds at least a portion of the splitter pigtails 705 of the second plurality.

Figure 15:
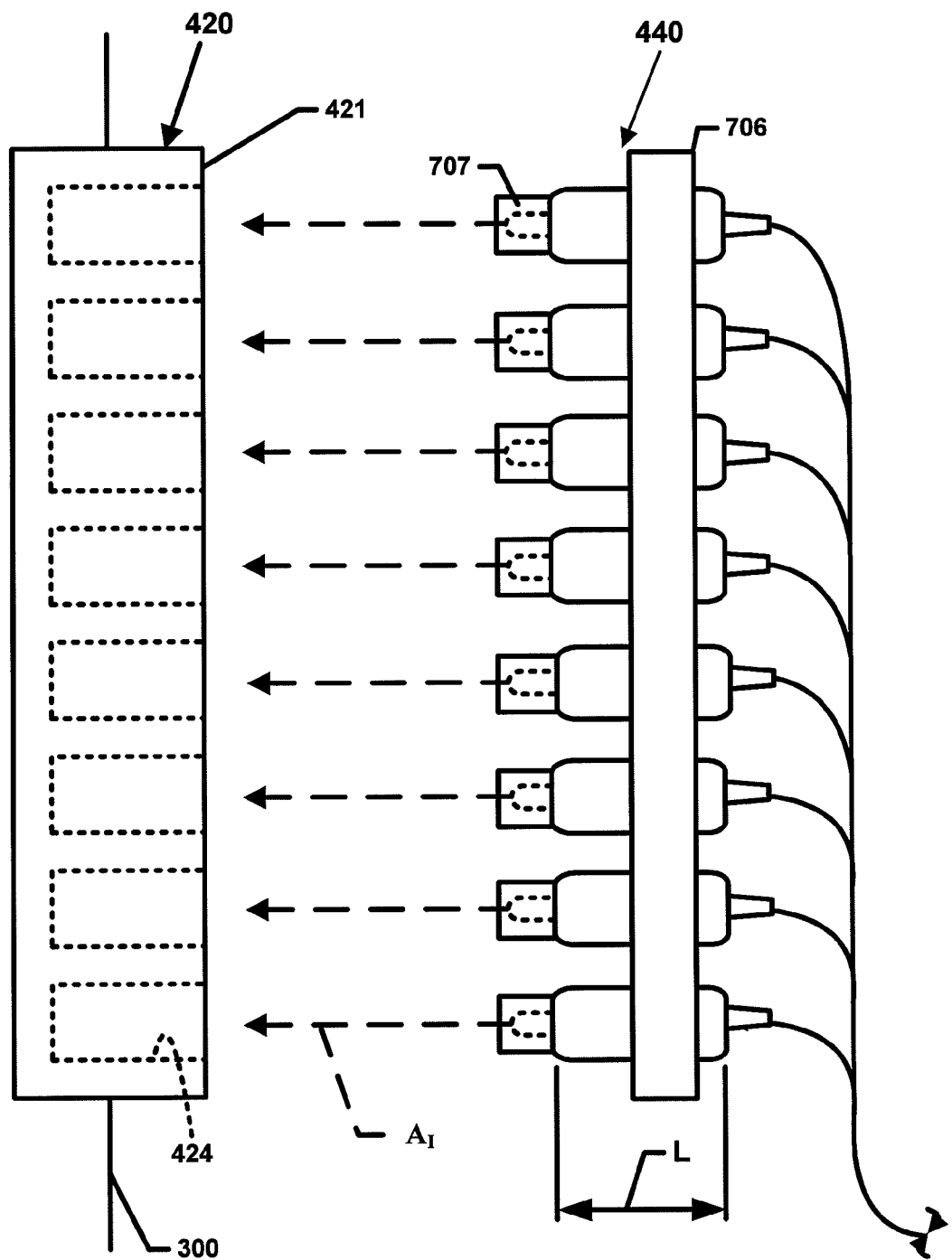
FIG. 15 is a schematic block diagram of the management module and splitter pigtails of an installation unit being installed on a swing frame by inserting the pigtail connectors into a storage module mounted to the swing frame in accordance with the principles of the present disclosure.

In general, the management module 440 does not cover the ferrules or dust caps 707 of the pigtail connectors 706. Rather, the management module 440 facilitates the installation of the pigtail connectors 706 into one or more storage modules 420 when the splitter module 430 is loaded onto the swing frame 300. For example, the management module 440 can enable the pigtail connectors 706 to be inserted into the storage module 420 as a unit. In certain embodiments, the management module 440 arranges the pigtails 705 so as to align the insertion axis $A_I$ of each pigtail connector 706 with a port opening 424 of the storage module housing 421. In one embodiment, the management module 440 arranges the pigtail connectors 706 into a linear configuration as shown in FIG. 15. For ease in viewing, FIG. 15 illustrates only one splitter module 430 having eight pigtails 704 being inserted into one storage module 420.

Figure 16:
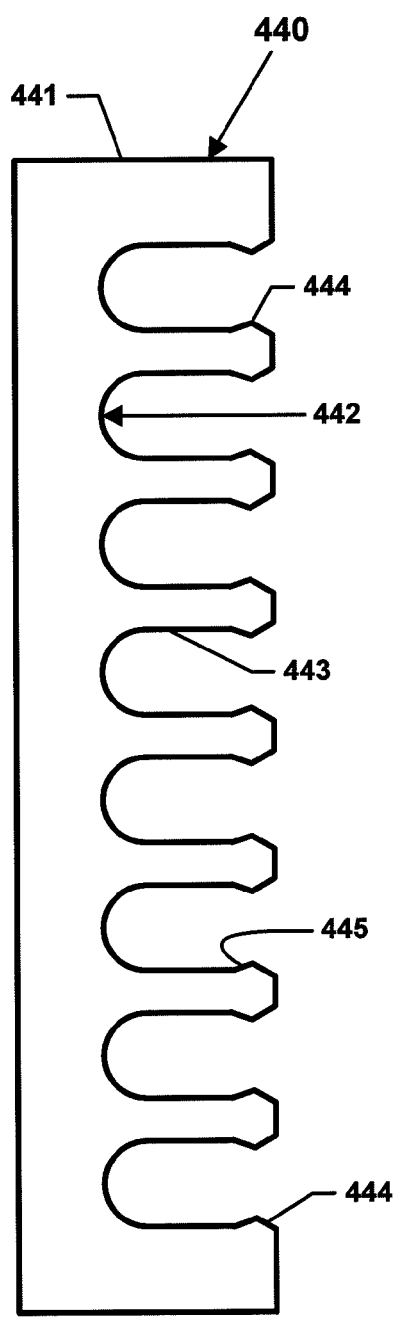
FIG. 16 is a schematic diagram of a front view of one example management module in accordance with the principles of the present disclosure.
Figure 17:
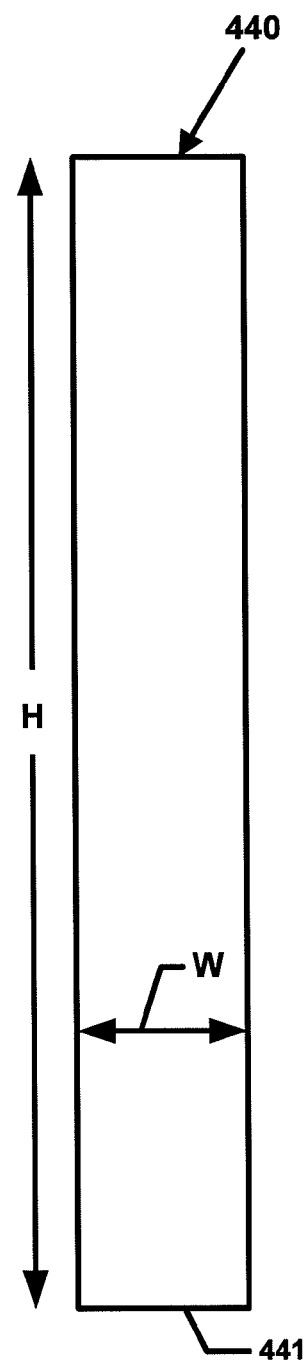
FIG. 17 is a schematic diagram of a first end view of the example management module of FIG. 16 in accordance with the principles of the present disclosure.
Figure 18:
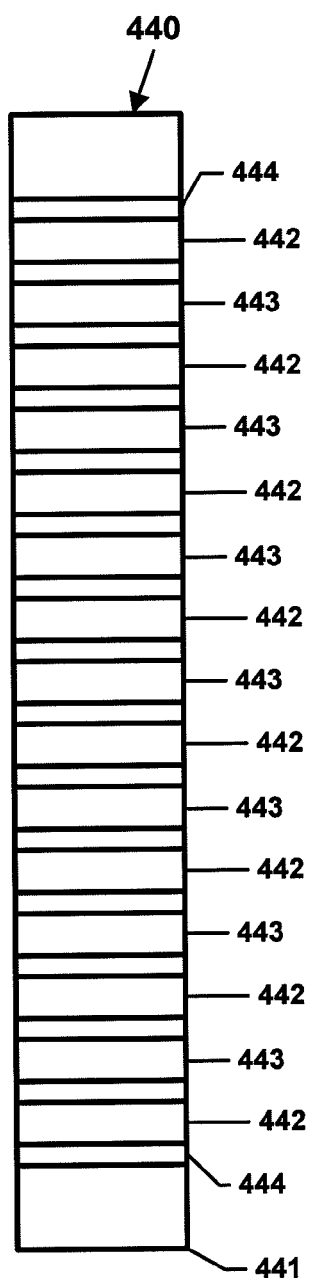
FIG. 18 is a schematic diagram of an opposite, second end view of the example management module of FIG. 16 in accordance with the principles of the present disclosure.

FIGS. 16-19 illustrate one example embodiment of a management module 440 configured to organize two or more pigtails 705 extending from a splitter module 430. FIG. 16 illustrates a front side of the example management module 440 and FIGS. 17 and 18 illustrate opposite ends of the example management module 440. The example management module 440 includes a body 441 defining one or more slots 442 configured to retain portions of the pigtails 705. The body 441 includes one or more fingers 443 between the slots 442. In one embodiment, the fingers 443 are flexible.

Figure 19:
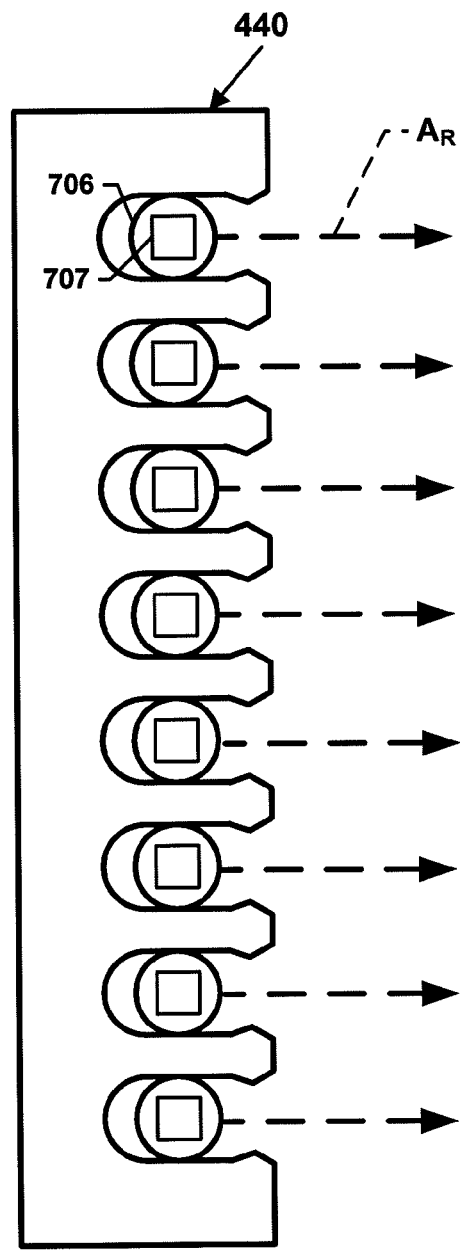
FIG. 19 is a schematic diagram showing a front view of pigtail connector being removed from the example management module of FIG. 16 in accordance with the principles of the present disclosure.

In some embodiments, each pigtail 705 is loaded into the management housing 441 by sliding the connector 706 along a slide axis $A_S$ into one of the slots 442 from an open end of the slot 442 (see FIG. 19). In one such embodiment, each finger 443 of the management housing 441 defines a cammed surface 444 to facilitate insertion of the connector 706 into the slot 442. The connector 706 is slid along the cammed surfaces 444 defined by two adjacent fingers 443 and into the corresponding slot 442. In other embodiments, each pigtail connector 706 can be inserted into the management housing 441 by sliding the connector 706 through the slot 442 from the front or rear of the housing 441.

The management housing 441 has a height H and a width W (see FIG. 17) that are sufficient to enable the housing 441 to receive and retain an appropriate number of pigtails 705. In one embodiment, the height H of the management housing 441 is sufficient to allow for spacing of the pigtail connectors 706 to align the connectors 706 with the ports 424 in the storage module 420. In the example shown in FIGS. 14 and 15, the width W of the management housing 441 is less than the length L (FIG. 15) of the pigtail connectors 706. In other embodiments, however, the width W of the management housing 441 can be equal to or greater than the length of the pigtail connectors 706.

In some embodiments, the management module 440 is removed from the pigtails 705 after the pigtail connectors 706 are inserted into the storage module 420. For example, the management module 440 can be removed by sliding the management housing 441 away from the pigtails 705 along a removal axis $A_R$. In general, the removal axis $A_R$ is not orientated parallel to the insertion axis $A_I$. In certain embodiments, the removal axis $A_R$ is oriented generally transverse to the insertion axis $A_I$. In one embodiment, the removal axis $A_R$ is oriented orthogonal to the insertion axis $A_I$.

In some embodiments, the connectors 706 can slide through the open end of the slots 442 in the management housing 441. In one embodiment, the fingers 443 can define additional cammed surfaces 445 facing an opposite direction from cammed surfaces 444. The additional cammed surfaces 445 facilitate sliding the connectors 706 through the open end of the slots 442. In other embodiments, the management housing 441 can be slid rearwardly of the pigtail connectors 706 along the insertion axis $A_I$ to remove the pigtail connectors 706 from the housing 441. Accordingly, the pigtail cables 704 coupled to the pigtails are slid into the slots 442 in the housing 441. The management housing 441 can be removed from the pigtails 705 by passing the pigtail cables 704 through the open ends of the slots 442.

In still other embodiments, the management module 440 can be removed from the pigtails 705 prior to insertion of the connectors 706 into the storage module 420 using any of the removal techniques disclosed above. Alternatively, the management housing 441 can be slid forwardly of the pigtail connectors 706 to remove the management module 440 from the splitter pigtails 705 prior to insertion of the pigtail connectors 706 into the storage module 420. In still other embodiments, the management module 440 can remain coupled to the splitter pigtails 705 for as long as the pigtails 705 are stored in the storage module 420.

Figure 20:
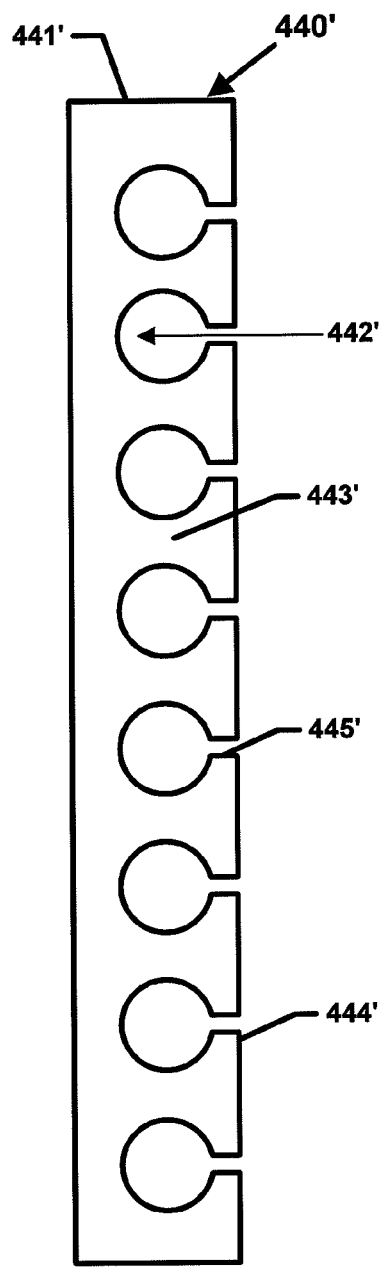
FIG. 20 is a schematic diagram of a front view of another example management module in accordance with the principles of the present disclosure.
Figure 21:
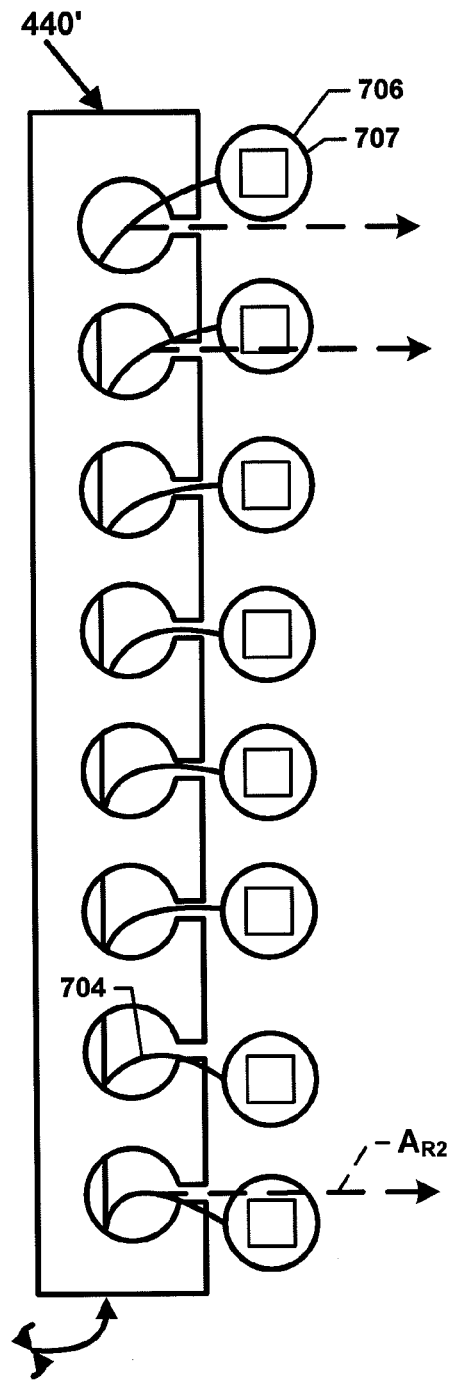
FIG. 21 is a schematic diagram showing a front view of splitter pigtails being removed from the example management module of FIG. 20 in accordance with the principles of the present disclosure.
Figure 22:
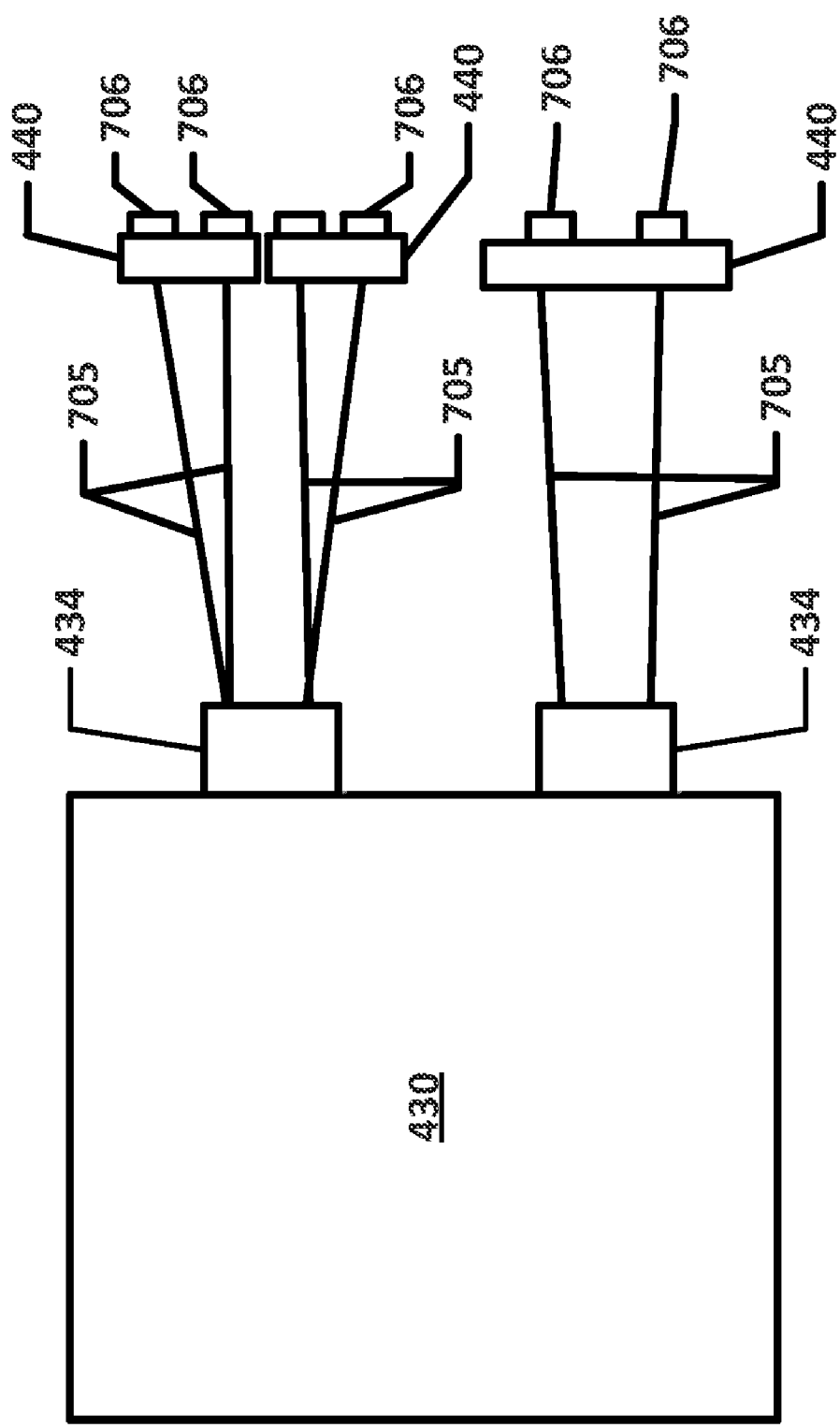
FIG. 22 is a schematic block diagram showing management modules holding splitter module pigtails.

FIGS. 20 and 21 illustrate another example embodiment of a management module 440' configured to organize two or more pigtails 705 extending from a splitter module 430. FIG. 20 illustrates a front side of the example management module 440'. The example management module 440' includes a body 441' defining one or more slots 442' configured to retain portions of the pigtails 705. The body 441' includes substantially rigid fingers 443' between the slots 442'. The fingers 443' have shoulder surfaces 444' that define narrowed channels 445'. The narrowed channels are sized to enable pigtail fibers 704 to pass through the channels 445', but to inhibit pigtail connectors 706 from passing through the channels 445'.

In some embodiments, each pigtail 705 is loaded into the management housing 441 by sliding the fiber 704 through one of the narrowed channels 445' along a removal axis $A_{R2}$ into one of the slots 442' (see FIG. 21). In certain embodiments, the corresponding connector 706 of each pigtail fiber 704 can then be backed (i.e., slid boot-side first) into the slot 442' from the front of the management housing 441'. In other embodiments, each pigtail connector 706 can be inserted into the management housing 441' by sliding the connector 706 through the slot 442' from the rear of the housing 441' without first feeding the fibers 704 through the channels 445'.

In some embodiments, the management module 440' is removed from the pigtails 705 after the pigtail connectors 706 are inserted into the storage module 420. For example, the management module 440' can be removed by sliding the management housing 441' away from the pigtails 705 along the removal axis $A_{R2}$. In general, the removal axis $A_{R2}$ is not orientated parallel to the insertion axis $A_I$. In certain embodiments, the removal axis $A_{R2}$ is oriented generally transverse to the insertion axis $A_I$. In one embodiment, the removal axis $A_{R2}$ is oriented orthogonal to the insertion axis $A_I$.

In some embodiments, the management housing 441' can be slid rearwardly of the pigtail connectors 706 along the insertion axis $A_I$ to remove the pigtail connectors 706 from the slots 442' defined in the housing 441'. The management housing 441' can be removed from the pigtails 705 by moving the management housing 441' along the removal axis $A_{R2}$, thereby passing the pigtail cables 704 through the open ends of the slots 442'. In other embodiments, the management module 440' can be removed from the pigtails 705 prior to insertion of the connectors 706 into the storage module 420. For example, the management housing 441' can be slid forwardly of the pigtail connectors 706 to remove the management module 440' from the splitter pigtails 705 prior to insertion of the pigtail connectors 706 into the storage module 420. In still other embodiments, the management module 440' can remain coupled to the splitter pigtails 705 for as long as the pigtails 705 are stored in the storage module 420.

Referring back to FIGS. 6-10, the swing frame 300 generally includes various cable management structures 450 to route the splitter pigtails 705 from the one or more splitter modules 430 to the one or more storage modules 420. For example, each pigtail 705 installed in the storage module 420 can be routed from the protective boot 434 of the splitter 430, across the top of the swing frame 300, down through a channel B (FIG. 6) on the front side of the swing frame 300, and across the bottom of the swing frame 300.

In some embodiments, the cable management structures include cable spools and/or half-spools positioned on the top and front of the swing frame 300. For example, in the embodiment shown in FIG. 6, first and second half-spools 952, 954 are provided at a top of the swing frame 300. Bend radius limiters also can be positioned on the swing frame 300 to aid in routing the splitter pigtails 704. In the example shown, some splitter pigtails 705 are routed from the splitter module 430, over a bend radius limiter 964, through channel B, to the storage modules 420 and/or termination modules 410. To avoid excessive weight or entanglement of the fibers 704, other splitter pigtails 705 can be routed into channel B over a different partial spool 966 instead of bend limiter 964. Extra slack also can be taken up by routing the pigtails 705 over spool 966 instead of over bend limiter 964.

In the example shown, the front of the swing frame 300 includes at least one row of partial spools 970 and at least one row of radius limiters 980. In one example embodiment, the partial spools 970 are oriented to enable pigtails 705 routed down channel B to wrap at least partially around one of the spools 970. The pigtails 705 can travel from the partial spools 970 either along the bottom of the swing frame 300 to the storage modules 420 or over the limiters 980 to the termination modules 410. The limiters 980 are oriented to enable pigtails 705 to travel from the partial spools 970 to the termination modules 410 without excessive bending.

Referring back to FIG. 7, when a pigtail 705 retained in a storage module 420 should be connected to a subscriber distribution line 708, the corresponding connector 706 is removed from the storage module 420 and transferred to the appropriate adapter 415 on a termination module 410. During this transfer process, the pigtail fiber 704 may need to be rewound around a different partial spool 970, such as partial spool 972, in order to reach the adapter 415. From the partial spool 972, the fiber 704 can be routed around a suitable limiter 980 to avoid excessive bending before reaching the adapter 415. In some embodiments, the fiber 704 is also fed through support fingers 990 extending from the front of the swing frame 300 before plugging into the adapter 415.

When all of the pigtail fibers 704 have been routed to subscriber termination modules 410, the empty storage modules 420 can be removed. In one embodiment, additional termination modules 410 can replace the empty storage modules 420. In another embodiment, the termination modules 410 cannot fit within the openings 314 provided for the storage modules 420.

The above specification, examples and data provide a complete description of the manufacture and use of the invention. Since many embodiments of the invention can be made without departing from the spirit and scope of the invention, the invention resides in the claims hereinafter appended.

I claim:
1. An installation unit comprising:
   a fiber optic splitter module including an optical splitter;
   a first plurality of splitter pigtails that extend outwardly from the splitter module, each of the splitter pigtails including at least one optical fiber terminated at a fiber optic connector, each fiber optic connector including at least one ferrule extending along an insertion axis, the ferrule being covered by a dust cap; and a first management module including a management housing defining a plurality of slots, each slot being configured to hold an individual one of at least a portion of the splitter pigtails so that the dust cap is exposed, the first management module being configured to be removed from the splitter pigtail by sliding the management module along a removal axis that extends at least partially transverse to the insertion axis.

2. The installation unit of claim 1, wherein the management housing retains the fiber optic connectors of the splitter pigtails within the slots defined in the management housing.

3. The installation unit of claim 1, wherein the splitter module is configured to receive a splitter input cable that carries signals to be split onto the splitter pigtails.

4. The installation unit of claim 1, further comprising a second management module including a second management housing defining a plurality of slots, each slot being configured to hold an individual one of at least another portion of the splitter pigtails of the first plurality.

5. The installation unit of claim 4, further comprising:
a second plurality of splitter pigtails extending outwardly from the splitter module, each of splitter pigtails of the second plurality of splitter pigtails being terminated by a fiber optic connector; and
a third management module including a third management housing defining a plurality of slots, each slot being configured to hold an individual one of at least a portion of the splitter pigtails of the second plurality of splitter pigtails.

6. The installation unit of claim 1, wherein the first plurality of splitter pigtails includes at least six splitter pigtails.

7. The installation unit of claim 1, wherein the first plurality of splitter pigtails includes at least sixteen splitter pigtails.

8. The installation unit of claim 1, wherein the splitter module can be releasably coupled to a telecommunications connection cabinet.

9. The installation unit of claim 1, wherein the fiber optic connectors terminating the splitter pigtails of the first plurality include SC connectors.

10. A method of increasing subscriber capacity of a fiber distribution hub cabinet containing at least one termination module and at least one storage module, the method comprising:
obtaining at least one installation unit including a splitter module and at least one management module, the splitter module including an optical splitter for splitting signals of an incoming optical fiber to a plurality of splitter pigtails terminated with fiber optic connectors, the management module retaining at least a portion of the splitter pigtails;
installing the installation unit within an interior of the fiber distribution hub cabinet including mounting the splitter module at a splitter location within the fiber distribution hub cabinet;
inserting the fiber optic connectors of the splitter pigtails into the storage module; and
removing the management module from the splitter pigtails while the pigtails are plugged into the storage module.

11. The method of claim 10, wherein the management module is removed prior to inserting the fiber optic connectors into the storage module.

12. The method of claim 10, wherein removing the management module from the splitter pigtails includes sliding the management module so that the fiber optic connectors of the splitter pigtails pass through open ends of slots defined in the management module.

13. The method of claim 10, wherein removing the management module from the splitter pigtails includes sliding the management module so that fibers of the splitter pigtails pass through open ends of slots defined in the management module.

14. The method of claim 10, wherein inserting the fiber optic connectors of the splitter pigtails into the storage module comprises inserting a first group of the fiber optic connectors into a first storage module and inserting a second group of the fiber optic connectors into a second storage module.

15. The method of claim 14, wherein removing the management module from the splitter pigtails comprises removing a first management module from the first group of fiber optic connectors and removing a second management module from the second group of fiber optic connectors.

16. The method of claim 10, further comprising routing the fiber optic connector of one of the splitter pigtails from the storage module to a termination adapter on the termination module to provide service to a subscriber.

17. The method of claim 10, wherein mounting the splitter module at the splitter location within the fiber distribution hub cabinet comprises mounting the splitter module to a swing frame pivotally arranged within the fiber distribution hub cabinet.

18. The method of claim 17, wherein mounting the splitter module to the swing frame pivotally arranged within the fiber distribution hub cabinet comprises pivoting the swing frame at least partially out of the cabinet to provide access to the splitter location.

19. The method of claim 10, wherein obtaining the installation unit comprises inserting the fiber optic connectors of the splitter pigtails within slots defined in a housing of the management module.

20. The method of claim 19, wherein inserting the fiber optic connectors of the splitter pigtails within the slots comprises inserting the fiber optic connectors within the slots so that ferrules of the fiber optic connectors remain uncovered by the management module.

21. The method of claim 10, wherein the fiber optic connectors of the splitter pigtails include ferrules covered by dust caps, and wherein inserting the fiber optic connectors of the splitter pigtails into the storage module comprises inserting the fiber optic connectors into the storage module without removing the dust caps from the fiber optic connectors.

22. An installation unit comprising:
a fiber optic splitter module including an optical splitter;
a first plurality of splitter pigtails that extend outwardly from the splitter module, each of splitter pigtails includes at least one optical fiber terminated at a fiber optic connector, each fiber optic connector including at least one ferrule extending along an insertion axis; and
a first management module including a management housing defining slots in which the first management module holds the fiber optic connector of at least one of the splitter pigtails, the first management module being configured to be removed from the splitter pigtail by sliding the management module along a removal axis that extends at least partially transverse to the insertion axis.

23. An installation unit comprising:
a fiber optic splitter module including an optical splitter;
a first plurality of splitter pigtails that extend outwardly from the splitter module, each of splitter pigtails includes at least one optical fiber terminated at a fiber optic connector, each fiber optic connector including at least one ferrule extending along an insertion axis;

a first management module including a management housing defining slots in which the first management module holds at least one of the splitter pigtails, the first management module being configured to be removed from the splitter pigtail by sliding the management module along a removal axis that extends at least partially transverse to the insertion axis; and a second management module including a second management housing defining slots in which the second management module holds at least a portion of the splitter pigtails of the first plurality.

* * * * *